United States Patent
Okuda et al.

[11] Patent Number: 5,923,645
[45] Date of Patent: Jul. 13, 1999

[54] CELL RATE CONTROL DEVICE AND METHOD

[75] Inventors: Masato Okuda; Kazuto Nishimura, both of Kanagawa, Japan

[73] Assignee: Fujitsu Limited, Kanagawa, Japan

[21] Appl. No.: 08/819,485

[22] Filed: Mar. 17, 1997

[30] Foreign Application Priority Data

Feb. 7, 1997 [JP] Japan ................................. 9-025030

[51] Int. Cl.$^6$ .............................. H04J 3/14; H04L 12/56
[52] U.S. Cl. ...................... 370/232; 370/237; 370/253; 370/395
[58] Field of Search ...................... 370/229, 231, 370/235, 237, 230, 232, 233, 234, 236, 216, 242, 244, 249, 252, 253, 389, 395; 395/200.62, 200.63, 200.64, 200.65

[56] References Cited

U.S. PATENT DOCUMENTS

| 5,504,744 | 4/1996 | Adams et al. | 370/232 |
| 5,633,859 | 5/1997 | Jain et al. | 370/234 |
| 5,675,576 | 10/1997 | Kalampoukas et al. | 370/232 |
| 5,701,291 | 12/1997 | Roberts | 370/232 |
| 5,701,292 | 12/1997 | Chiussi et al. | 370/232 |
| 5,748,901 | 5/1998 | Afek et al. | 395/200.68 |
| 5,784,358 | 7/1998 | Smith et al. | 370/230 |
| 5,787,073 | 7/1998 | Ikeda | 370/236 |

FOREIGN PATENT DOCUMENTS 09083537  3/1997  Japan .

*Primary Examiner*—Alpus H. Hsu
*Attorney, Agent, or Firm*—Helfgott & Karas, PC

[57] ABSTRACT

A bottleneck path prediction/storage unit predicts a bottleneck path, that is, a logic circuit whose transmission rate is limited by a cell switching unit other than a predetermined cell switching unit, the logic circuit being one of the logic circuits which use a predetermined physical circuit in the predetermined cell switching unit. An ER computation unit sets an ER value in a resource management cell transferred through the physical circuit based on a state (number of active logic circuits) of the logic circuit which uses the physical circuit and information about the bottleneck path predicted by the bottleneck path prediction/storage unit.

25 Claims, 23 Drawing Sheets

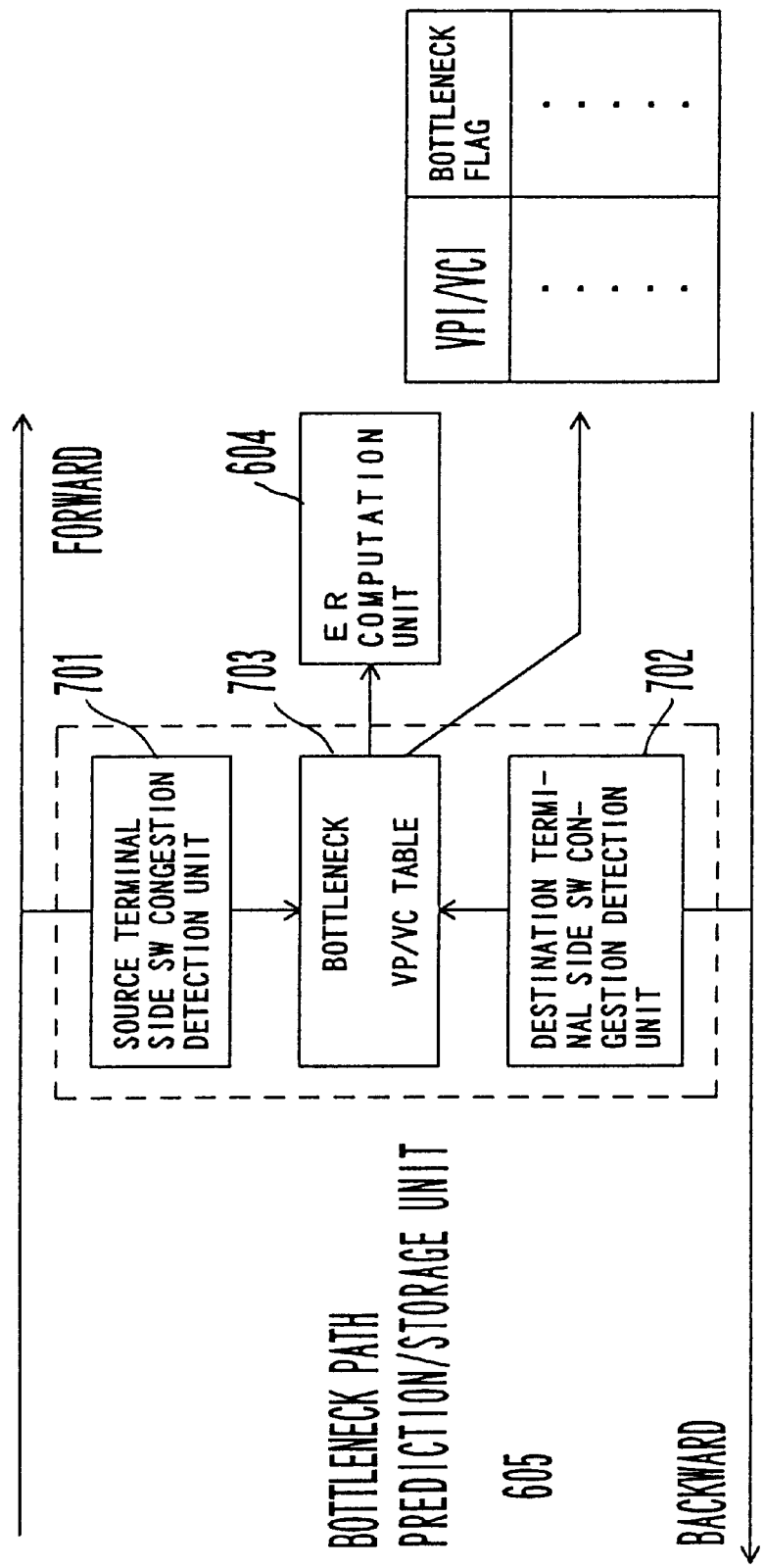
F I G. 7

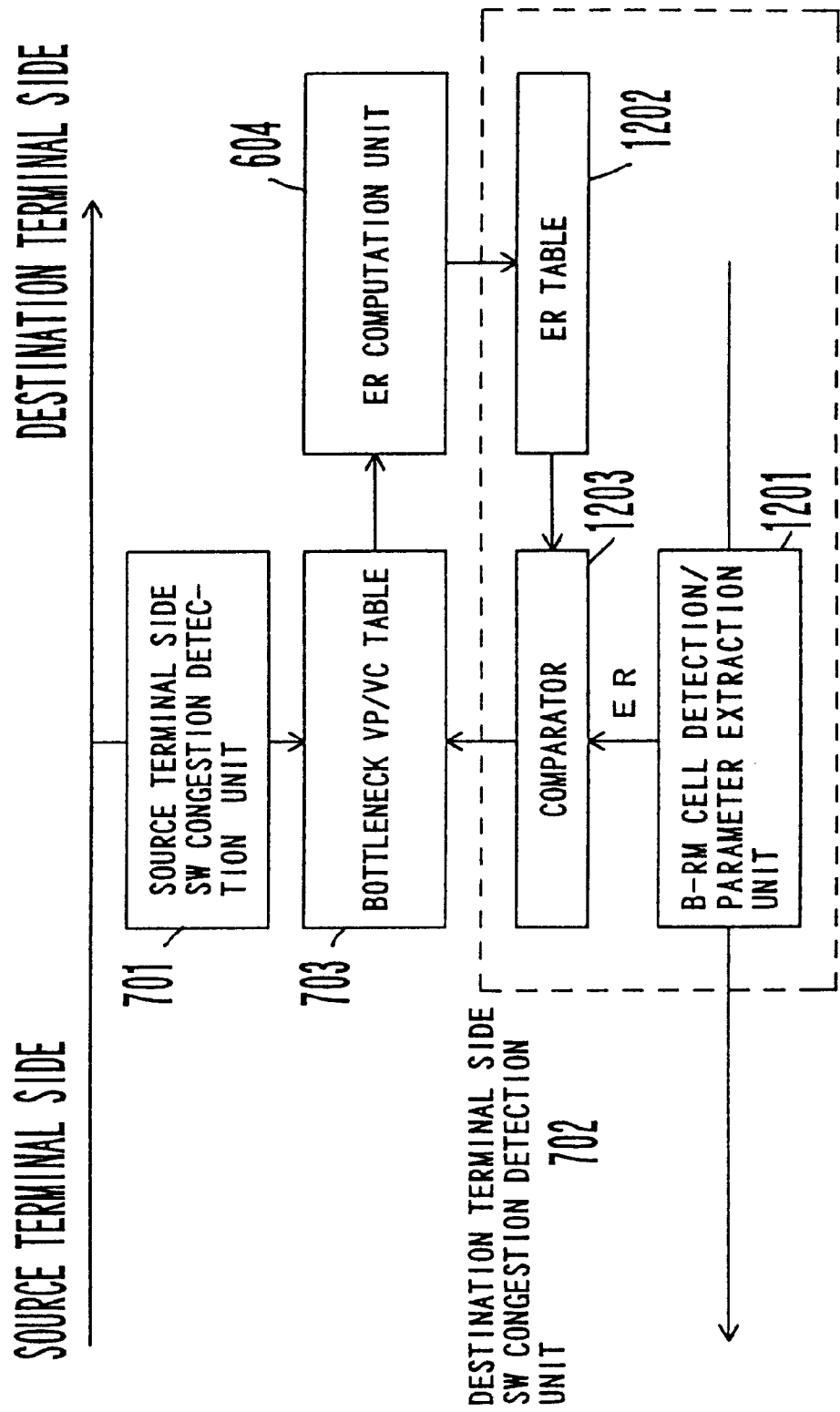
F I G. 1 2

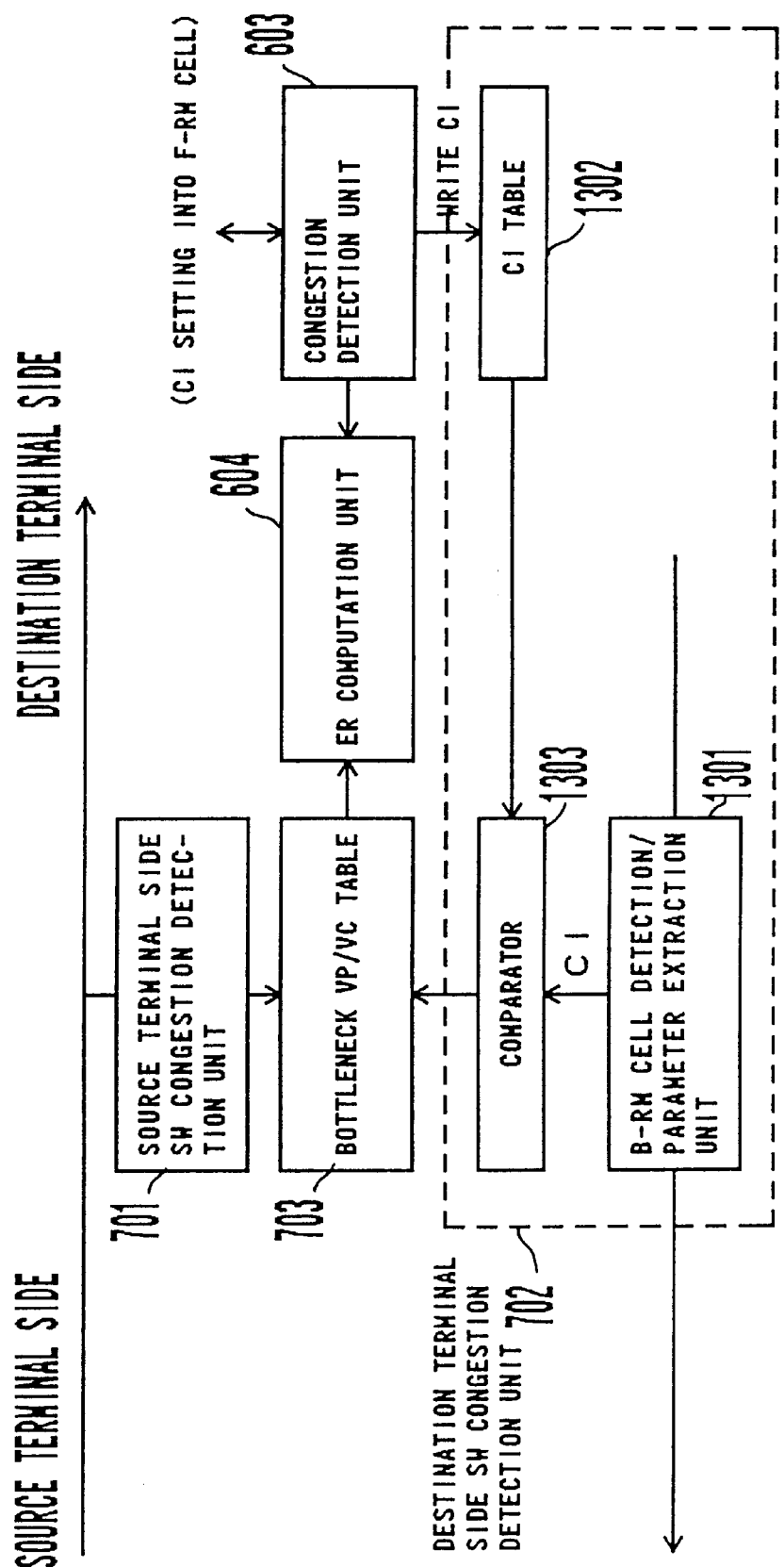
F I G. 13

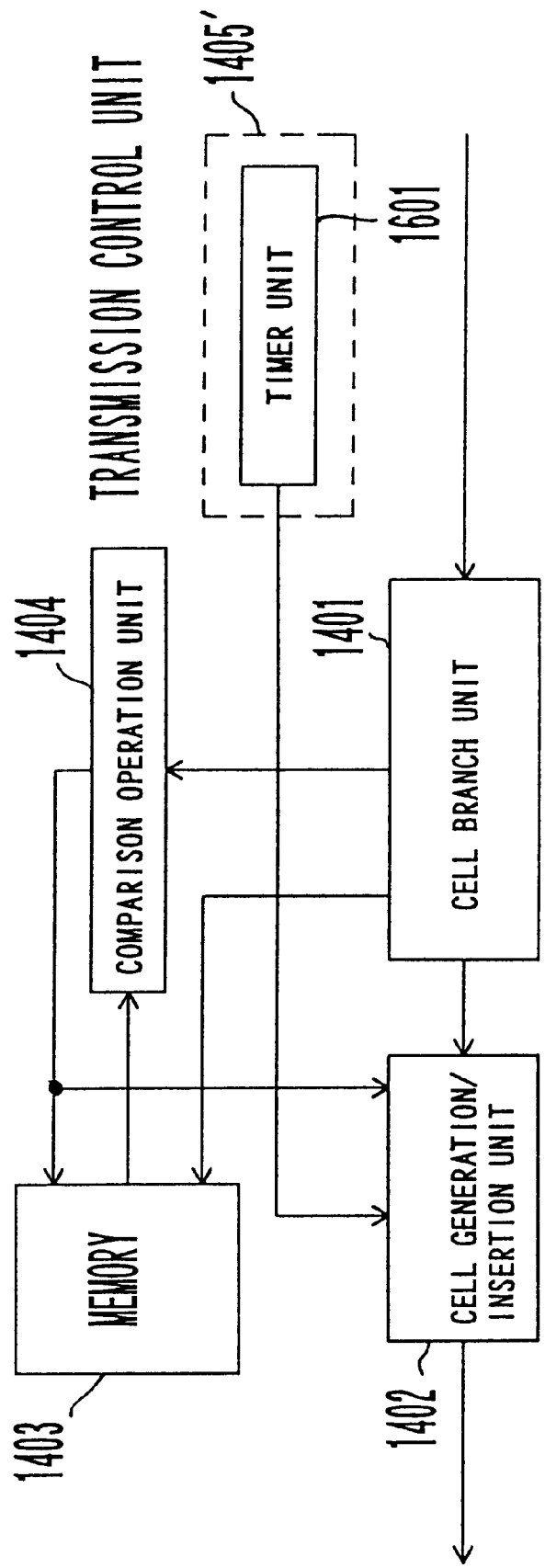
F I G. 1 6

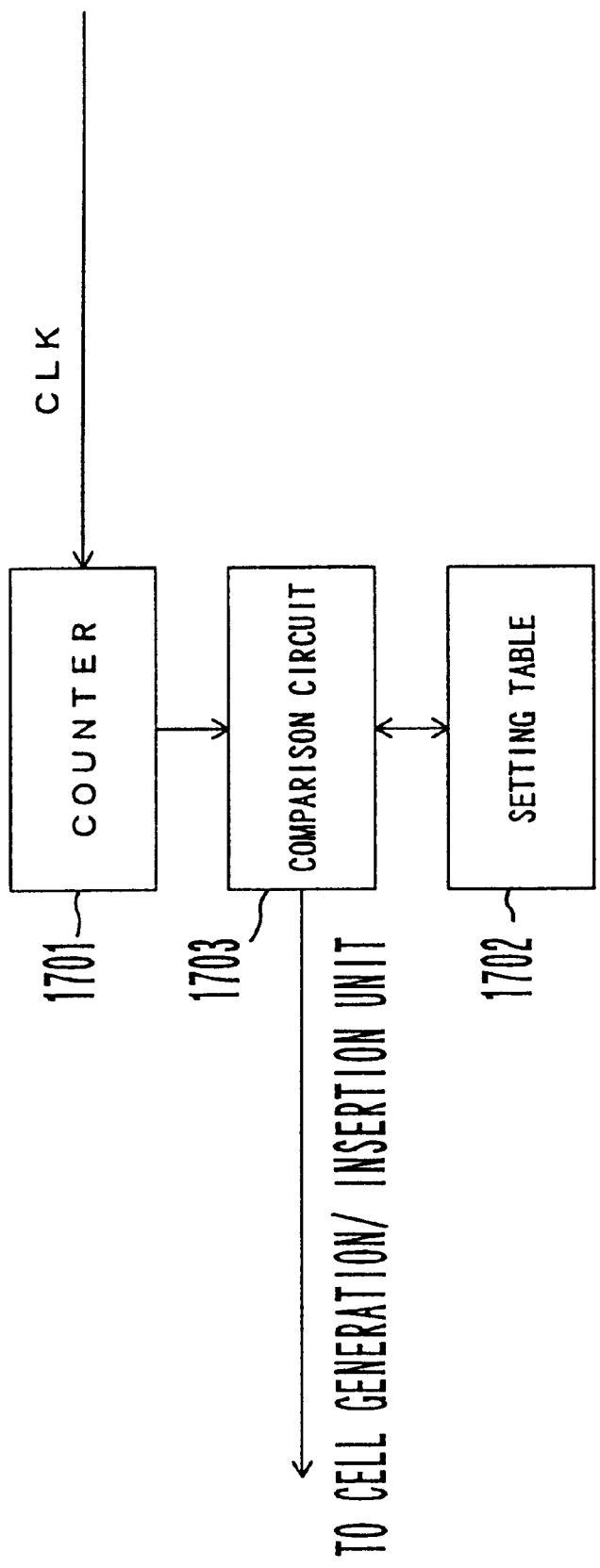
F I G. 17

| VC | GENERATION / INSERTION TIME | INSERTION INTERVAL |
|---|---|---|
| 1 | 1 1 0 | 1 0 |
| n | 1 2 0 | 2 0 |

FIG. 18

CELL RATE CONTROL DEVICE AND METHOD

BACKGROUND OF THE INVENTION

1. Field of the Invention

The present invention relates to a technology of controlling a bit rate of cells in a cell network, for example, an ATM network.

2. Description of the Related Art

An available bit rate (ABR) service has been introduced as a service based on a data exchange technology with an asynchronous transfer mode (ATM) method in an ATM forum and an ITU-T. The ABR service allows the network to avoid a network congestion by feeding back the network congestion information from a switching unit to a source terminal. That is, the ABR service is designed to efficiently operate a network, avoid the congestion in the network, and reduce the loss of cells by monitoring the condition of the network resources and altering the transmission rate of the source terminal through the switching unit. Described below is the detail of the ABR service.

FIG. 1 shows the rate control in the ABR service.

In FIG. 1, 101 and 102 are terminals. 103 and 104 are ATM switching units forming part of an ATM network. 107 is a main information cell (user cell). 108 is a forward (from a source terminal to a destination terminal) resource management cell (F-RM cell). 109 is a backward (from a destination terminal to a source terminal) resource management cell (B-RM cell).

Thus, the resource management (RM) cells are used in the communications through the ABR service to notify a terminal of the information about network resources.

The source terminal 101 sends the F-RM cell 108 each time $N_{rm}-1$ main information cells 107 are transmitted. The F-RM cell 108 reaches the destination terminal 102 through the ATM switching units 103 and 104.

When the destination terminal 102 receives the main information cell 107 and the F-RM cell 108, it loops back the F-RM cell 108 and sends it as the B-RM cell 109 to the source terminal 101.

On the other hand, the ATM switching units 103 and 104 notify the source terminal 101 of the information from the network by writing the resource information (band width information and congestion information) in the switching unit to the RM cells 108 and 109 passing through the ATM switching units 103 and 104. When the source terminal 101 receives the RM cell to which the band width information, congestion information, etc. are written, it computes its own allowed cell rate (ACR) again according to the information, and performs communications at a rate of or lower than the ACR.

At the start of the communications, the source terminal 101 declares the maximum transmission rate, that is, the peak cell rate (PCR), and the minimum transmission rate, that is, the minimum cell rate (MCR), and negotiates with the network. The source terminal 101 cannot send an ATM cell (hereinafter referred to simply as a cell) at a rate higher than the PCR determined as a result of the negotiation. The ATM switching units 103 and 104 in the ATM network guarantee the source terminal 101 a rate higher than the MCR determined as a result of the negotiation. Therefore, the allowed cell rate ACR in the source terminal 101 alters within the range between the MCR and the PCR ($MCR \leq ACR \leq PCR$).

In these operations, the ATM network can avoid the congestion or recover from the congestion, and the terminals can transmit cells at a high transmission rate when the network resources are available.

The operations of the source terminal (ABR source terminal) 101 and the destination terminal (ABR destination terminal) 102 in the communications using the ABR service are standardized by the ATM Forum. Briefly described below are the important operations of these terminals.

ABR Source Terminal 101

The source terminal 101 transmits cells at a rate equal to or lower than the allowed cell rate ACR at each timing. The ABR source terminal 101 transmits the F-RM cell 108 each time a predetermined number (Nrm−1) of main information cells (user cells) 107 have been transmitted. When the source terminal 101 receives the B-RM cell 109, it adds a predetermined value to the value of the ACR if a congestion indicator (CI) bit in the B-RM cell 109 is set to 0 (non-congestion). The source terminal 101 subtracts a predetermined value from the value of the ACR if a congestion indicator (CI) bit in the B-RM cell 109 is set to 1 (congestion). Furthermore, when the above described operations are performed, the source terminal 101 compares an explicit rate ER written to the B-RM cell 109 with the re-computed ACR, and determines the smaller value as a new ACR. At this time, the value of the ACR should be determined between $MCR \leq ACR \leq PCR$. Then, the source terminal 101 sets the actual transmission rate determined based on the above described ACR as a current cell rate CCR in the F-RM cell 108 to be sent by the source terminal 101.

ABR Destination Terminal 102

The destination terminal 102 terminates the main information cell (user cell) 107 transmitted from the source terminal, and loops back the received F-RM cell 108 and transmits it as the B-RM cell 109 to the source terminal 101. At this time, the destination terminal 102 sets the congestion indicator bit CI in the B-RM cell 109, which is transmitted after being looped back, to 1 if an explicit forward congestion indicator bit EFCI in the main information cell 107 received immediately before receiving the F-RM cell 108 is set to 1.

Corresponding to the operations of the above described source terminal 101 and destination terminal 102, the operations of the ATM network providing the ABR service, that is, the ATM switching units 103 and 104, can be divided into four types. They are an EFCI Marking operation, a Relative Rate Marking operation, an Explicit Rate Marking operation, and a Virtual Source/Virtual Destination (VS/VD) control operation.

EFCI Marking

The ATM switching units 103 and 104 set the EFCI bit in the main information cell 107, which passes through the ATM switching units 103 and 104, when the congestion is occurring.

Relative Rate Marking

The ATM switching units 103 and 104 write the CI bit or the NI bit to the F-RM cell 108 or the B-RM cell 109 which passes through the ATM switching unit 103 or 104, depending on the internal resources and congestion state.

Explicit Rate Marking

The ATM switching units 103 and 104 compute the allowed transmission rate for the source terminal 101, that is, the explicit rate ER, depending on the internal resources and congestion state, and write the resultant value to the F-RM cell 108 or the B-RM cell 109 passing through the ATM switching unit 103 and 104. At this time, the ATM switching units 103 and 104 compare the ER value in the F-RM cell 108 or the B-RM cell 109 with the ER value computed by the switching units, and rewrite the smaller value to the F-RM cell 108 or the B-RM cell 109.

VS/VD Control

The control loop in the ABR service is divided by the function of the virtual source (source terminal) and the virtual destination (destination terminal) which the ATM switches 103 and 104 realize, thereby improving the control response.

First Problem

In the above described ABR service, the ATM switching unit counts the number of active logic circuits for each physical circuit as a method of computing the above described explicit rate ER (hereinafter referred to as an ER value), and computes the transmission rate obtained by dividing the transmission rate of the physical circuit by the number of the active logic circuits as the transmission rate, that is, the ER value, to be assigned to the active logic circuits which use the physical circuit. This method is well-known as a fair share method.

In this method, when five logic circuits are provided for the physical circuit having the transmission rate of 150 Mbps (megabits/second), a band of 150/5=30 Mbps is assigned to one logic circuit.

However, if the band of one logic circuit is limited to, for example, 5 Mbps by another ATM switching unit in the above described fair share method, then the band of 30 Mbps is also assigned to such a logic circuit, and a band of 30-5=25 Mbps cannot be actually used in the ATM switching unit which has assigned the 30 Mbps band, thereby lowering the utilization of the system.

FIG. 2 shows the above described first problem.

In FIG. 2, it is assumed that the transmission rate of the physical circuit between the switches SWs is 150 Mbps. Each of the SWs specifies the ER value in such a way that the transmission rate can be equally assigned in each physical circuit to the active logic circuits which use each physical circuit.

For example, switch SW#1 equally assigns in the physical circuit for connecting switch SW#1 to switch SW#3 the transmission rate of 50 Mbps to each of the active logic circuits A, B, and C which use the physical circuit. Switch SW#3 equally assigns in the physical circuit for connecting switch SW#3 to switch SW#4 the transmission rate of 50 Mbps to each of the active logic circuits A, B, and D which use the physical circuit, and equally assigns in the physical circuit for connecting switch SW#3 to switch SW#5 the transmission rate of 75 Mbps to each of the active logic circuits C and E which use the physical circuit.

Since switch SW#3 can assign the transmission rate of 75 Mbps to logic circuit C whereas switch SW#1 can assign the transmission rate of only 50 Mbps to logic circuit C, switch SW#1 is a bottleneck to logic circuit C. Therefore, for example, terminal C which uses logic circuit C can use only the band corresponding to the transmission rate of 50 Mbps. As a result, the band corresponding to the transmission rate of 75−50=25 Mbps cannot be used in the physical circuit for connecting switch SW#3 to switch SW#5.

Similarly, switch SW#2 equally assigns in the physical circuit for connecting switch SW#2 to switch SW#3 the transmission rate of 75 Mbps to each of the active logic circuits D, and E which use the physical circuit. Switch SW#3 equally assigns in the physical circuit for connecting switch SW#3 to switch SW#4 the transmission rate of 50 Mbps to each of the active logic circuits A, B, and D which use the physical circuit, and equally assigns in the physical circuit for connecting switch SW#3 to switch SW#5 the transmission rate of 75 Mbps to each of the active logic circuits C and E which use the physical circuit.

Since switch SW#2 can assign the transmission rate of 75 Mbps to logic circuit D whereas switch SW#3 can assign the transmission rate of only 50 Mbps to logic circuit D, switch SW#3 is a bottleneck to logic circuit D. Therefore, for example, terminal D which uses logic circuit D can use only the band corresponding to the transmission rate of 50 Mbps. As a result, the band corresponding to the transmission rate of 75−50=25 Mbps cannot be used in the physical circuit for connecting switch SW#2 to switch SW#3.

Thus, if there is a bottleneck path in the conventional fair share method, that is, if the transmission rate of a certain logic circuit is limited depending on the congestion state of an ATM switching unit when the ER value is computed in a predetermined ATM switching unit, then the band of the predetermined ATM switching unit cannot be efficiently assigned.

Second Problem

Next, one-to-one communications are commonly established between one source terminal and one destination terminal in the ABR service. It is also possible to support multi-cast communications in which one ATM cell sent from a source terminal can be distributed to a plurality of destination terminals by copying the ATM cell in the ATM switching unit.

In this case, not only the main information cell 107 but also the F-RM cell transmitted each time a predetermined number of main information cells have been transmitted from the source terminal can be multi-cast. At this time, each of the F-RM cells is looped back at each destination terminal and fed back as a B-RM cell to the source terminal. In such a case, one F-RM cell transmitted from the source terminal is multiplexed for the multi-cast, and fed back as B-RM cells only to cause the problem that the backward network resources are wasted.

FIG. 3 shows the above described second problem.

In FIG. 3, 301 is a source terminal. 305 through 309 are destination terminals. 302 through 304 are ATM communications devices including an ATM switching unit, etc.

The source terminal 301 sends one F-RM cell 311 each time (Nrm−1) main information cells 310 have been transmitted.

The ATM communications device 302 copies the main information cell 310 and F-RM cell 311 to provide them for each of the corresponding paths whose number is determined according to the call control information. The ATM communications device 302 sends a main information cell copy $310_1$ and an F-RM cell copy $311_1$ to the ATM communications device 303, and sends a main information cell copy $310_2$ and an F-RM cell copy $311_2$ to the ATM communications device 304.

The ATM communications device 303 copies the main information cell $310_1$ and F-RM cell $311_1$ to provide them for each of the corresponding paths whose number is determined according to the call control information. Similarly, the ATM communications device 304 copies the main information cell $310_2$ and F-RM cell $311_2$ to provide them for each of the corresponding paths whose number is determined according to the call control information. The ATM communications device 303 sends a main information cell copy $310_{11}$ and an F-RM cell copy $311_{11}$ to the destination terminal 305, sends a main information cell copy $310_{12}$ and an F-RM cell copy $311_{12}$ to the destination terminal 306, and sends a main information cell copy $310_{13}$ and an F-RM cell copy $311_{13}$ to the destination terminal 307. Similarly, the ATM communications device 304 sends a main information cell copy $310_{21}$ and an F-RM cell copy $311_{21}$ to the destination terminal 308, and sends a main information cell copy $310_{22}$ and an F-RM cell copy $311_{22}$ to the destination terminal 309.

The destination terminals 305 through 309 receive and terminate main information cell copies $310_{11}$ through $310_{13}$ and main information cell copies $310_{21}$ and $310_{22}$, receive and loop back each of the F-RM cell copies $311_{11}$ through $311_{13}$, and $311_{21}$ and $311_{22}$, and send them as B-RM cell $312_1$ through $312_5$ on the way to the source terminal 301.

The ATM communications device 303 gathers and sends B-RM cells $312_1$ through $312_3$ to the ATM communications device 302. The ATM communications device 304 gathers and sends B-RM cells $312_4$ and $312_5$ to the ATM communications device 302. The ATM communications device 302 gathers and sends B-RM cells $312_1$ through $312_3$ from the ATM communications device 303, and B-RM cells $312_4$ and $312_5$ from the ATM communications device 304 to the source terminal 301.

Assuming that the number of multi-cast paths is M, the source terminal 301 has to receive and process the B-RM cells 312 which are M times as many as the F-RM cells 311 sent by the source terminal 301, thereby increasing the process load at the source terminal 301 and generating the problem that the backward network sources are wasted.

SUMMARY OF THE INVENTION

The present invention has been developed based on the above described background, and aims at solving the above described first and second problems and realizing an appropriate ABR control.

The present invention is based on a cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell.

The first aspect of the present invention has the following configuration.

First, a bottleneck path prediction unit (bottleneck path prediction/storage unit 605) predicts a bottleneck path, that is, a logic circuit whose transmission rate is limited by a cell switching unit other than a predetermined cell switching unit, the logic circuit being one of logic circuits using a predetermined physical circuit in the predetermined cell switching unit.

Next, a rate control information setting unit (ER computation unit 604 and congestion detection unit 603) sets rate control information in a resource management cell transferred through the physical circuit based on a state of the logic circuit using the physical circuit, the congestion state in a switch in the predetermined cell switching unit, and information about the bottleneck path predicted by the bottleneck path prediction unit.

With the configuration according to the first aspect of the present invention, the rate control information setting unit can effectively assign a band of each logic circuit in the cell switching unit based on the prediction result of the bottleneck path obtained by the bottleneck path prediction unit.

With the configuration according to the above described first aspect of the present invention, the bottleneck prediction unit includes a source terminal side congestion state detection unit and a destination terminal side congestion state detection unit. The source terminal congestion state detection unit (source terminal SW congestion detection unit 701) detects as a bottleneck path a logic circuit in the congestion state in a cell switching unit at the source terminal side of the predetermined cell switching unit. The destination terminal side congestion state detection unit (destination terminal SW congestion detection unit 702) detects as a bottleneck path a logic circuit in the congestion state in a cell switching unit at the destination terminal side of the predetermined cell switching unit. The rate control information setting unit further sets the rate control information in the resource management cell transferred through the physical circuit according to information about the bottleneck path detected by the source terminal side congestion state detection unit or the destination terminal side congestion state detection unit.

With the above described configuration, the bottleneck path from the congestion state in the source terminal cell switching unit and the bottleneck path from the congestion state in the destination terminal cell switching unit can be efficiently predicted.

The above described source terminal side congestion state detection unit can be designed to include a first forward resource management cell detection/parameter extraction unit and a first comparison unit. The first forward resource management cell detection/parameter extraction unit detects, for each logic circuit, a forward resource management cell transferred through the physical circuit from the source terminal to the predetermined cell switching unit, and extracts from the forward resource management cell a current cell rate indicating the transmission rate of a current cell and an explicit rate indicating the transmission rate of a cell specified for the source terminal. The first comparison unit detects, for each logic circuit, as the bottleneck path, the logic circuit in the congestion state in the cell switching unit at the source terminal side by comparing the current cell rate with the explicit rate both extracted by the first forward resource management cell detection/parameter extraction unit.

With this configuration, a logic circuit whose congestion state has been detected by the source terminal side ATM switching unit can be correctly specified.

Furthermore, the above described source terminal side congestion state detection unit can be designed to include a second forward resource management cell detection/ parameter extraction unit, a first explicit rate storage unit, and a second comparison unit. The second forward resource management cell detection/parameter extraction unit detects, for each logic circuit, a forward resource management cell transferred through the physical circuit from the source terminal to the predetermined cell switching unit, and extracts from the forward resource management cell a current cell rate indicating the transmission rate of a current cell. The first explicit rate storage unit stores, for each logic circuit, an explicit rate currently set by said rate control information setting unit in a backward resource management cell transferred through the physical circuit from the destination terminal to the predetermined cell switching unit. The second comparison unit further detects, for each logic circuit, as the bottleneck path, the logic circuit in the congestion state in the cell switching unit at the source terminal side by comparing the current cell rate extracted by the second forward resource management cell detection/ parameter extraction unit with a current explicit rate stored in the first explicit rate storage unit.

With this configuration, a logic circuit whose congestion state has been detected by the source terminal side ATM switching unit can be correctly specified.

Furthermore, the above described source terminal side congestion state detection unit can be designed to include a third forward resource management cell detection/parameter extraction unit and a third comparison unit. The third forward resource management cell detection/parameter extraction unit detects, for each logic circuit, a forward resource management cell transferred through the physical circuit from the source terminal to the predetermined cell switching unit, and extracts congestion indicator information indicating the congestion state from the forward resource management cell. The third comparison unit detects, for each logic circuit, as the bottleneck path, the logic circuit in the congestion state in the cell switching unit at the source terminal side according to the congestion indicator information extracted by the third forward resource management cell detection/parameter extraction unit.

With this configuration, a logic circuit whose congestion state has been detected by the source terminal side ATM switching unit can be correctly specified.

Furthermore, the above described source terminal side congestion state detection unit can be designed to include a main information cell detection/parameter extraction unit and a fourth comparison unit. The main information cell detection/parameter extraction unit detects, for each logic circuit, a main information cell transferred through the physical circuit from the source terminal to the predetermined cell switching unit, and extracts explicit forward congestion indicator information indicating the congestion state from the main information cell. The fourth comparison unit detects, for each logic circuit, as the bottleneck path, the logic circuit in the congestion state in the cell switching unit at the source terminal side according to explicit forward congestion indicator information extracted by the main information cell detection/parameter extraction unit.

With this configuration, a logic circuit whose congestion state has been detected by the source terminal side ATM switching unit can be correctly specified.

The above described destination terminal side congestion state detection unit can be designed to include a first backward resource management cell detection/parameter extraction unit, a second explicit rate storage unit, and a fifth comparison unit. The first backward resource management cell detection/parameter extraction unit detects, for each logic circuit, a backward resource management cell transferred through the physical circuit from the destination terminal to the predetermined cell switching unit, and extracts from the backward resource management cell the explicit rate indicating the transmission rate of a cell specified for the source terminal. The second explicit rate storage unit stores, for each logic circuit, an explicit rate currently set by the rate control information setting unit in a forward resource management cell transferred through the physical circuit from the source terminal to the predetermined cell switching unit. The fifth comparison unit further detects, for each logic circuit, as the bottleneck path, the logic circuit in the congestion state in the cell switching unit at the destination terminal side by comparing the explicit rate extracted by the first backward resource management cell detection/ parameter extraction unit with a current explicit rate stored in the second explicit rate storage unit.

With this configuration, a logic circuit whose congestion state has been detected by the destination terminal side ATM switching unit can be correctly specified.

The above described destination terminal congestion state detection unit can be designed to include a second backward resource management cell detection/parameter extraction unit, a congestion indicator information storage unit, and a sixth comparison unit. The second backward resource management cell detection/parameter extraction unit detects, for each logic circuit, a backward resource management cell transferred through the physical circuit from the destination terminal to the predetermined cell switching unit, and extracts congestion indicator information indicating the congestion state from the backward resource management cell. The congestion indicator information storage unit stores, for each logic circuit, congestion indicator information currently set by the rate control information setting unit in a forward resource management cell transferred through the physical circuit from the source terminal to the predetermined cell switching unit. The sixth comparison unit further detects, for each logic circuit, as the bottleneck path, the logic circuit in the congestion state in the cell switching unit at the source terminal side based on the congestion indicator information extracted by the second backward resource management cell detection/parameter extraction unit and current congestion indicator information stored in the congestion indicator information storage unit.

With this configuration, a logic circuit whose congestion state has been detected by the destination terminal side ATM switching unit can be correctly specified.

The second aspect of the present invention is realized by the following configuration.

First, a cell branch unit (cell branch unit 1401) detects and terminates, for each logic circuit established on a physical circuit, a backward resource management cell transferred through the physical circuit from the destination terminal to the predetermined cell switching unit.

A backward resource management cell content storage unit (memory 1403) stores, for each logic circuit, contents of the backward resource management cell.

A comparison operation unit (comparison operation unit 1404) updates, for each logic circuit, contents of the backward resource management cell stored in the backward resource management cell content storage unit by comparing the contents of the backward resource management cell currently terminated by the cell branch unit with the contents of the backward resource management cell previously stored in the backward resource management cell content storage unit.

Furthermore, a cell generation/insertion unit (cell generation/insertion unit 1402) generates, for each logic circuit, the backward resource management cell whose contents are stored in the backward resource management cell content storage unit corresponding to the logic circuit, and inserts the cell into the physical circuit from the destination terminal to the predetermined cell switching unit.

Additionally, a transmission control unit (transmission control unit 1405) instructs, for each logic circuit, the cell generation/insertion unit to generate and insert the backward resource management cell by generating a predetermined timing signal.

With the configuration according to the above described second aspect of the present invention, the backward resource management cells, which are the same in number as the multi-cast paths, can be sampled and transmitted to the source terminal for a logic circuit using a multi-cast ABR service, thereby efficiently using the band of the backward resource management cell.

The third aspect of the present invention is realized by the following configuration.

First, a cell branch unit (cell branch unit 1901) detects and terminates, for each logic circuit established on a physical circuit, a backward resource management cell transferred through the physical circuit from the destination terminal to the predetermined cell switching unit.

A backward resource management cell content storage unit (memory 1903) sequentially stores, for each logic circuit, contents of a plurality of the backward resource management cells sequentially terminated by the cell branch unit.

A comparison operation unit (comparison operation unit 1907) performs, for each logic circuit, a comparison operation by comparing the contents of a plurality of the backward resource management cells previously stored in the backward resource management cell content storage unit.

Furthermore, a cell generation/insertion unit (cell generation/insertion unit 1902) generates, for each logic circuit, a backward resource management cell having contents corresponding to a comparison operation result from the comparison operation unit, and inserts the cell into the physical circuit from the destination terminal to the predetermined cell switching unit.

Additionally, a transmission control unit (transmission control unit 1904) generates, for each logic circuit, a predetermined timing signal to instruct the comparison operation unit to perform the comparison operation and the cell generation/insertion unit to generate and insert the backward resource management cell.

With the configuration according to the above described third aspect of the present invention, the process load can be reduced from each logic circuit each time the backward resource management cell arrives.

With the configuration according to the above described second or third aspect of the present invention, the transmission control unit can be designed to include a first cell count unit (cell count circuit 1501) and a seventh comparison unit (comparison circuit 1502). The first cell count unit counts, for each logic circuit, a number of the backward resource management cells arriving at the cell branch unit. The seventh comparison unit compares, for each logic circuit, a count value of the first cell count unit with a predetermined value, and, if a matching result is detected, clearing the count value of the first cell count unit and generating the predetermined timing signal.

With the configuration, if the number of multi-casts is, for example, S in one logic circuit using the multi-cast ABR service, then one backward resource management cell is generated and transmitted each time S backward resource management cells are terminated for the logic circuit, thereby effectively using the band of a backward circuit.

The above described transmission control unit can also be designed to include a first timer unit (timer unit 1601). The first timer unit generates, for each logic circuit, the predetermined timing signal at a predetermined time corresponding to the logic circuit.

With this configuration, if the number of multi-cast paths is, for example, S in one logic circuit using the multi-cast ABR service, then one backward resource management cell is generated and transmitted each time S backward resource management cells are terminated at predetermined time intervals for the logic circuit, thereby effectively using the band of a backward circuit.

Furthermore, the above described transmission control unit can also be designed to include a main information cell time interval count unit (main information cell identification unit 2002, and counter 2003) and a second timer unit (timer unit 2001). The main information cell time interval count unit counts, for each logic circuit, a time interval of a main information cell transferred through the physical circuit from the source terminal to the predetermined cell switching unit. The second timer unit generates, for each logic circuit, the predetermined timing signal at a predetermined time corresponding to the time interval of the main information cell counted by the main information cell time interval count unit.

With this configuration, the timing of sending a backward resource management cell for each logic circuit can be proportional to the arrival time intervals of a predetermined number of main information cells for each logic circuit.

Furthermore, the above described transmission control unit can also be designed to include a backward resource management cell time interval count unit (counter 2102) and a third timer unit (timer unit 2101). The backward resource management cell time interval count unit counts, for each logic circuit, an arrival time interval of the backward resource management cell at the cell branch unit. The third timer unit generates, for each logic circuit, the predetermined timing signal at a predetermined time corresponding to the arrival time interval of the backward resource management cell counted by the backward resource management cell time interval count unit.

With this configuration, the sending timing of the backward resource management cell for each logic circuit can be proportional to the arrival time intervals of a predetermined number of backward resource management cells for each logic circuit.

The transmission control unit can also be designed to include a circuit comparison unit (circuit comparison unit 2201). The circuit comparison unit generates the predetermined timing signal when the backward resource management cell of a specific logic circuit arrives at the cell branch unit.

With this configuration, the influence of a backward resource management cell in a logic circuit having a broad band and a high cell transmission rate can be reduced by issuing an instruction to transmit a backward resource management cell for each logic circuit when the arrival of the backward resource management cell of a specific logic circuit using a multi-cast ABR service is detected.

Furthermore, the transmission control unit can be designed to include a second cell count unit (cell count circuit 1501), a fourth timer unit (timer unit 2301), and an OR gate (OR circuit 2302). The second cell count unit counts, for each logic circuit, a number of the backward resource management cells arriving at the cell branch unit. The fourth timer unit counts, for each logic circuit, a predetermined time interval. The OR gate unit clears, for each logic circuit, a count value of the cell count unit and the fourth timer unit and generates, for each logic circuit, the predetermined timing signal when a matching result is detected after comparing a count value of the second cell count unit with a predetermined value or when the fourth timer unit counts a predetermined time interval, whichever occurs earlier With the above described configuration, an instruction can be appropriately issued to send the backward resource management cells even if the backward resource management cell does not arrive for any reason or the arrival time is extremely delayed.

BRIEF DESCRIPTION OF THE DRAWINGS

Other objects and features of the present invention can be easily recognized by one of ordinary skill in the art by referring to the descriptions of the preferred embodiments and the attached drawings of the present invention.

FIG. 7 shows the configuration of the bottleneck path prediction/storage unit according to the first embodiment of the present invention;

FIG. 12 shows the configuration (1) of the destination terminal SW congestion detection unit according to the first embodiment of the present invention;

FIG. 13 shows the configuration (2) of the destination terminal SW congestion detection unit according to the first embodiment of the present invention;

FIG. 16 shows the configuration according to the third embodiment of the present invention;

FIG. 17 shows the configuration of the timer according to the third embodiment of the present invention;

FIG. 18 shows the configuration of the setting table according to the third embodiment of the present invention;

DESCRIPTION OF THE PREFERRED EMBODIMENTS

The preferred embodiments of the present invention are described below in detail by referring to the attached drawings.

Configuration of the system to which each preferred embodiment is applied

The configuration of the system to which each of the preferred embodiments is applied is described below before explaining in detail each embodiment of the present invention.

Figure 1:
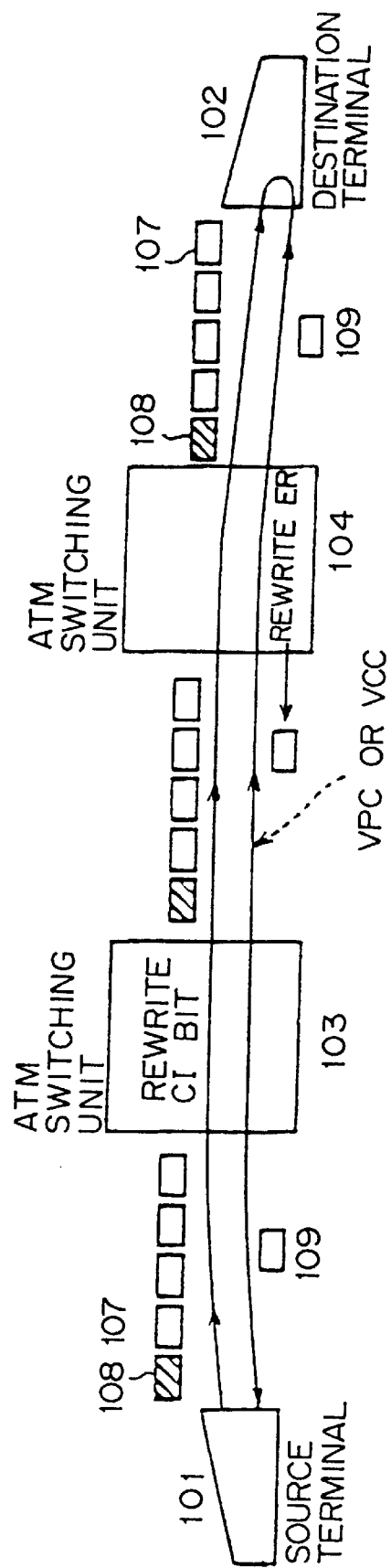
FIG. 1 shows the rate control in the ABR service.
Figure 2:
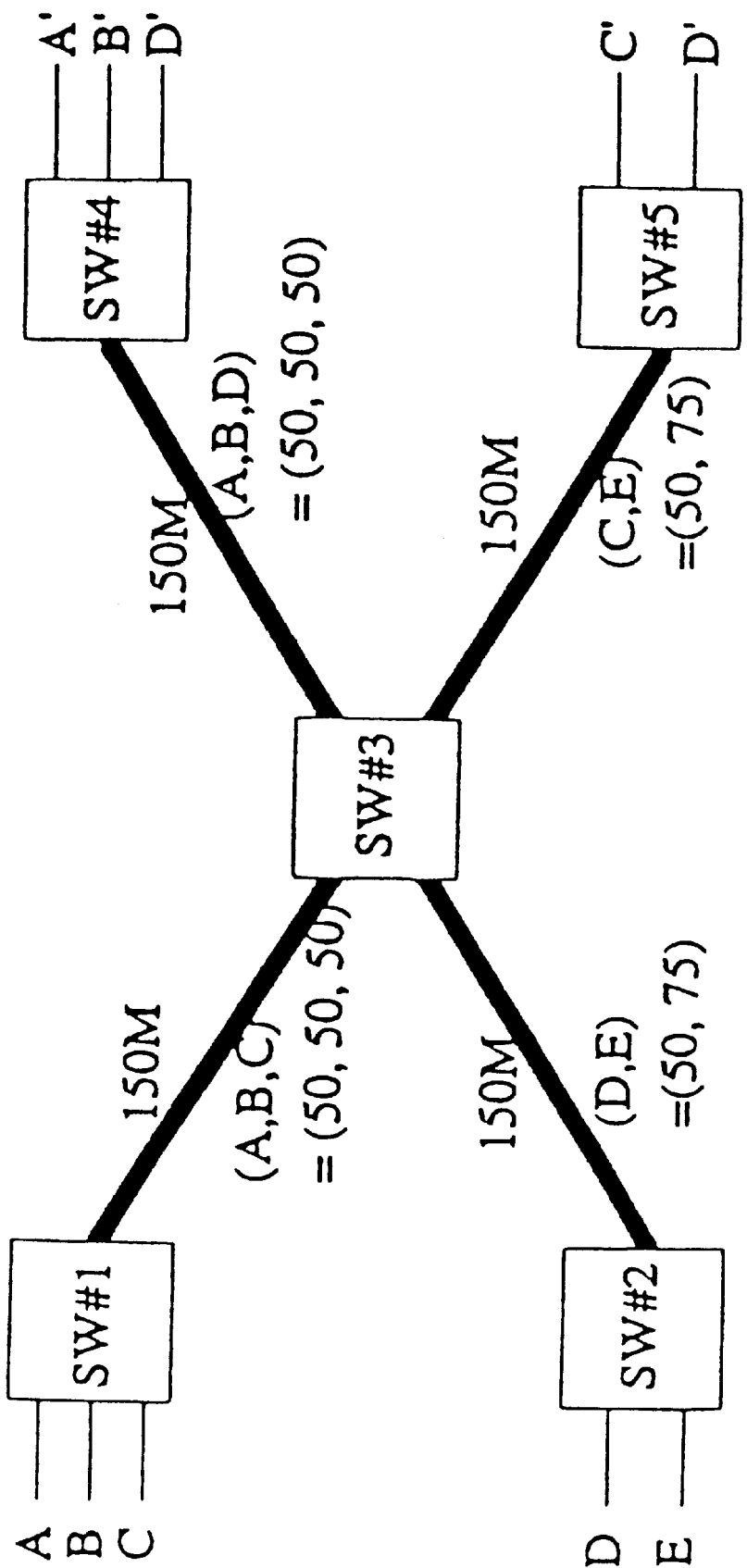
FIG. 2 shows the problem of the conventional technology.
Figure 3:
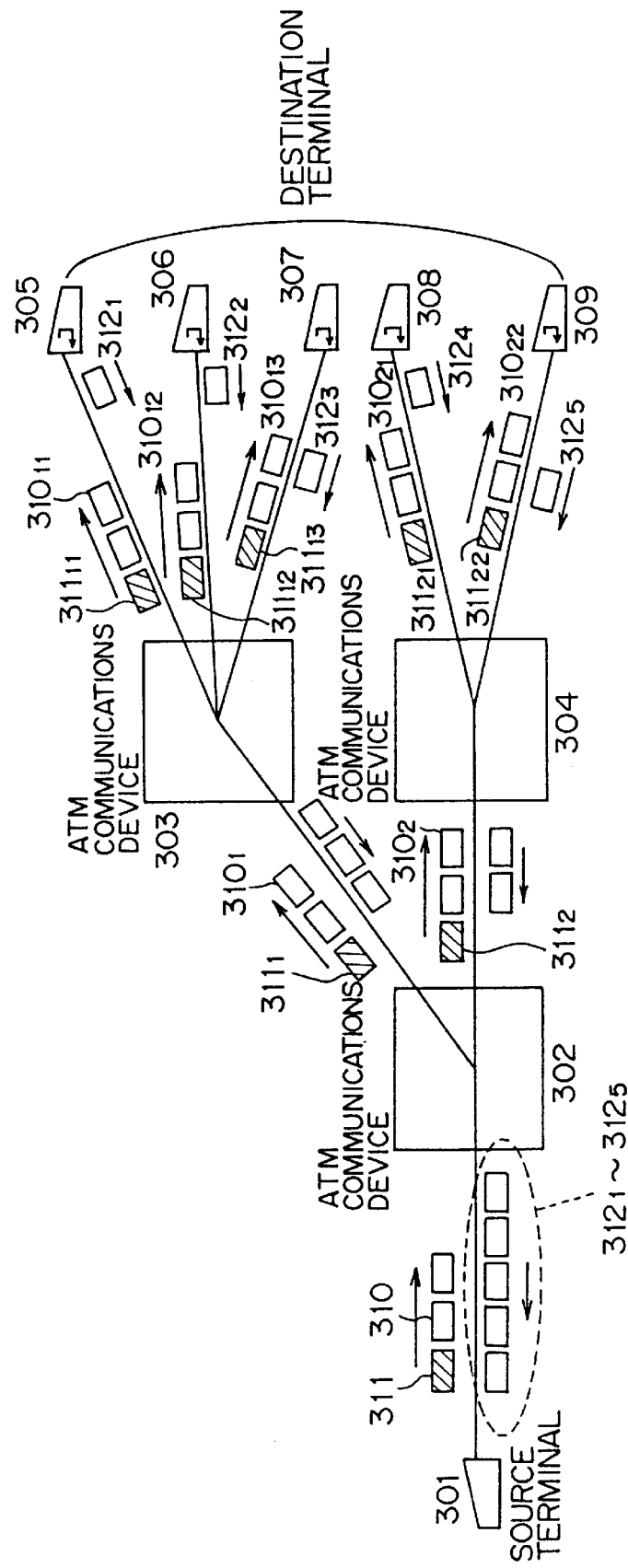
FIG. 3 shows the multi-cast in the ABR service.
Figure 4:
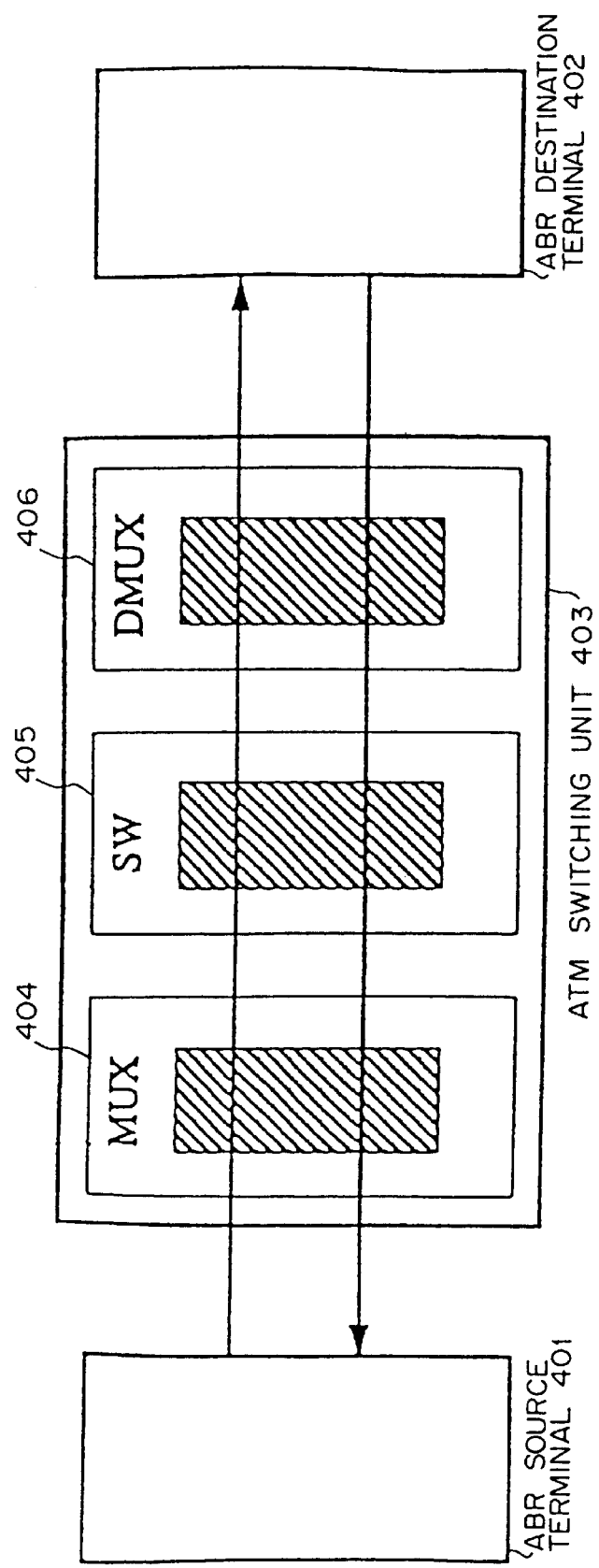
FIG. 4 shows the configuration of the system to which each of the embodiments of the present invention is applied.

FIG. 4 shows the configuration of the system to which each of the preferred embodiment of the present invention is applied.

In this system, a source terminal 401 which uses an ABR service (hereinafter referred to as an ABR source terminal 401) and a destination terminal 402 which uses the ABR service (hereinafter referred to as an ABR destination terminal 402) communicate with each other through an ATM switching unit 403 using the ABR service. The ATM switching unit 403 between the ABR source terminal 401 and the ABR destination terminal 402 is not limited to a single unit, but can be a plurality of units.

The ATM switching unit 403 comprises a multiplexing unit (MUX) 404 for multiplexing input circuits and connecting them to an internal input highway; a switch unit (SW) 405 for switching the input highway to an output highway; and a demultiplexing unit (DMUX) 406 for demultiplexing the output highway and connecting it to an output circuit.

The above described ABR control units for controlling various parameters in the ABR service are provided as necessary corresponding to each cell memory for temporarily storing an ATM cell in each of the MUX 404, SW 405, and DMUX 406. The configuration according to each of the preferred embodiments of the present invention described later and shown in FIGS. 6 through 23 realizes the ABR control units.

Figure 5:
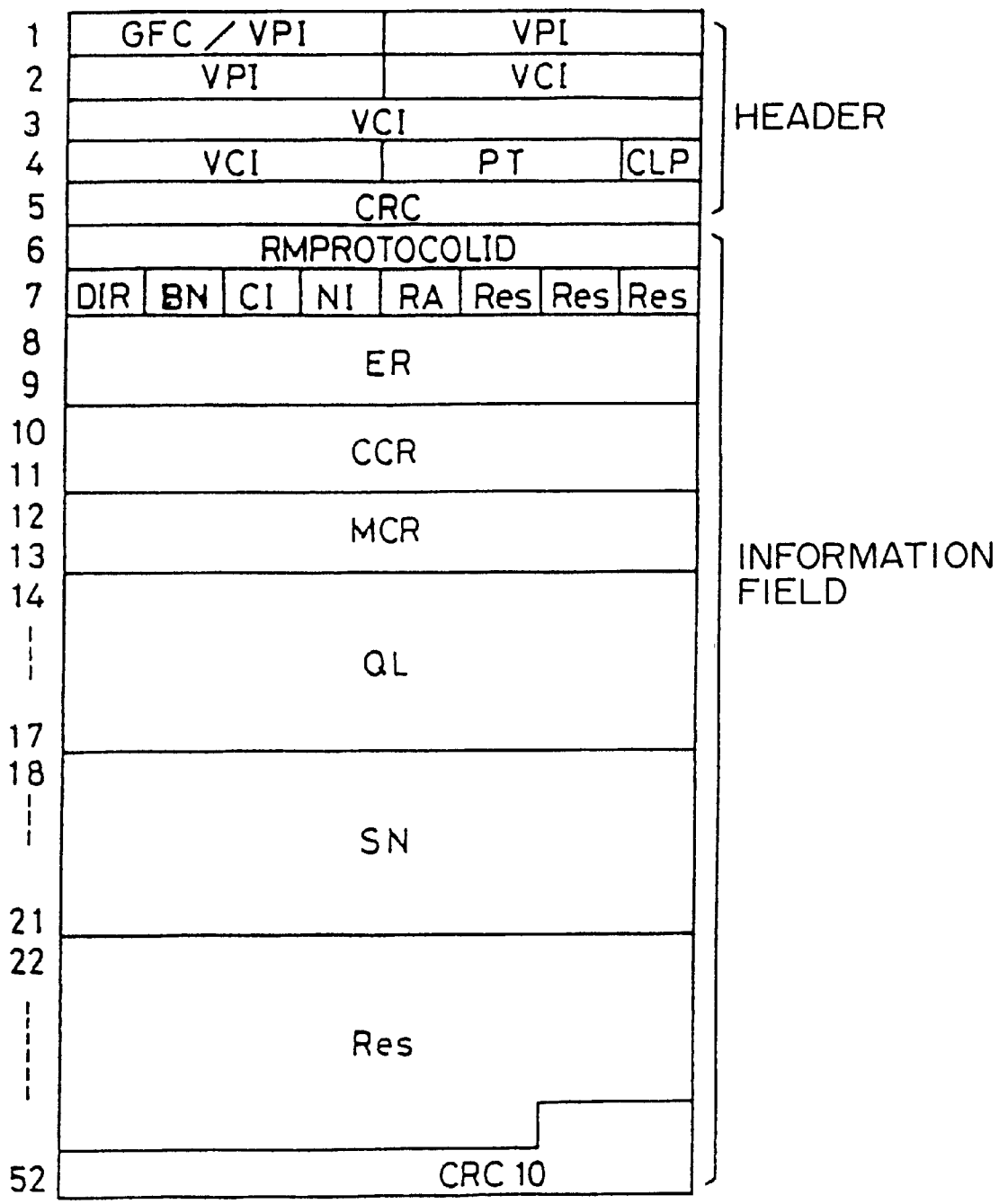
FIG. 5 shows the data format of an RM cell.

Data format of an RM cell used in each of the preferred embodiments of the present invention FIG. 5 shows the data format of an RM cell used in each of the preferred embodiments of the present invention. Like a common ATM cell, the RM cell comprises a 5-byte header and a 48-byte information field (payload).

First, 3-bit data '110' is set in the payload type field PT of the header in the RM cell. If the RM cell is used in a virtual path connection ABR service, VCI=6 is set in the header.

Then, in the information field, the RM protocol ID at the sixth octet is set to 1 indicating the ABR service.

The seventh octet of the RM cell is referred to as a message type field with any of the following bit information set therein.

DIR: direction indicator bit. forward =0, and backward =1.

BN: BECN cell indicator bit. BN =1 is set when the ATM switching unit or the destination terminal generates a B-RN cell. Thus, the F-RM cell generated by the source terminal is distinguished from the B-RM cell generated by the ATM switching unit or the destination terminal.

CI: congestion indicator bit. CI=1 (congestion), and CI=0 (non-congestion). When CI=1, it is requested that the allowed cell rate ACR of the source terminal should be reduced.

NI: No Increase bit. It is set to suppress the allowed cell rate ACR of the source terminal. Unlike the CI bit, the NI bit does not request to reduce the allowed cell rate ACR. Normally, the source terminal transmits an RM cell with NI=0 set therein.

RA: Request/Acknowledge bit. It is not used in the ABR service prescribed by the ATM Forum. An explicit rate ER is set in the eighth and ninth octets of the RM cell. This field specifically relates to the present invention.

Since each field of the 10th through 51st octets of the RM cell does not relate to the present invention, the detailed descriptions are omitted here.

The CRC-10 code set at the 52nd and 53rd octets of the RM cell is a data error detection/correction code.

First Preferred Embodiment

Figure 6:
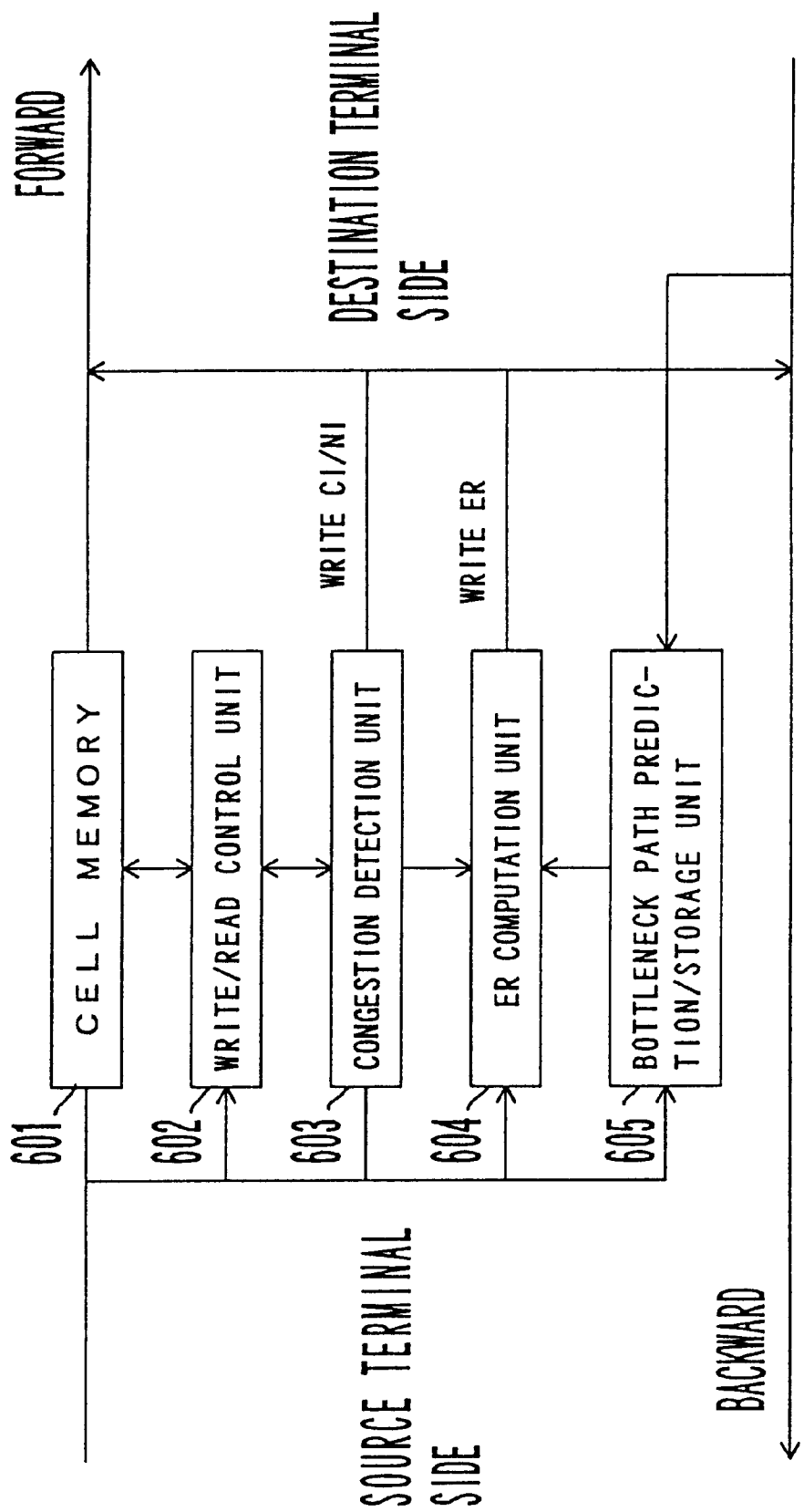
FIG. 6 shows the configuration according to the first embodiment.

FIG. 6 shows the configuration according to the first preferred embodiment of the present invention. This embodiment aims at solving the first problem explained above in the description of the related art.

In FIG. 6, a cell memory 601 is provided in an MUX 404, an SW 405, or a DMUX 406 shown in FIG. 4, and temporarily stores the ATM cell transferred forward (from the source terminal to the ATM switching unit).

A write/read control unit 602 controls writing and reading an ATM cell to the cell memory 601.

The congestion detection unit 603 detects the congestion state of the cell memory 601 by determining the size of the blank areas in the cell memory 601 through the write/read control unit 602. When the congestion state is detected, a CI bit or an NI bit is set in one or both of the forward RM cell (F-RM cell) and the backward RM cell (B-RM cell).

The bottleneck path prediction/storage unit 605 predicts a bottleneck path whose transmission rate is limited by the congestion in another ATM switching unit.

The ER computation unit 604 computes an ER value based on the number of active logic circuits (VC) on the forward physical circuit and the transmission rate of the physical circuit, the congestion state of the cell memory 601 detected by the congestion detection unit 603, and the information relating to the bottleneck path predicted by the bottleneck path prediction/storage unit 605, and sets the computed ER value in the F-RM cell or the B-RM cell.

With the configuration according to the first preferred embodiment of the present invention shown in FIG. 6, the ER computation unit 604 can effectively assign each band to a logic circuit which uses the ABR service in the ATM switching unit based on the bottleneck prediction result from the bottleneck path prediction/storage unit 605.

Practically, the ER computation unit 604 subtracts the sum of the ER values (set in the F-RM cell in each connection) for the logic circuit corresponding to the bottleneck path from the transmission rate of the forward physical circuit, divides the subtraction result by the number of active logic circuits other than those corresponding to the bottleneck path, and sets the result in the corresponding F-RM cell or B-RM cell as an ER value corresponding to the active logic circuits other than the logic circuits corresponding to the bottleneck path.

FIG. 7 shows the practical configuration of the bottleneck path prediction/storage unit 605 shown in FIG. 6.

In FIG. 7, a bottleneck VP/VC table 703 stores a bottleneck flag set when a bottleneck state is detected in the ATM switching unit, for each virtual path identifier/virtual channel identifier (VPI/VCI) of a logic circuit which uses the ABR service.

The source terminal side SW congestion detection unit 701 detects the congestion state in the ATM switching unit (source terminal side SW) at the source terminal side for each logic circuit, and sets the bottleneck flag at the address of the bottleneck VP/VC table 703 corresponding to the VPI/VCI of the logic circuit in which a congestion state has been detected.

Similarly, the destination terminal side SW congestion detection unit 702 detects the congestion state in the ATM switching unit (destination terminal side SW) at the destination terminal side, and sets the bottleneck flag at the address of the bottleneck VP/VC table 703 corresponding to the VPI/VCI of the logic circuit in which a congestion state has been detected.

With the configuration shown in FIG. 7, the bottleneck path caused by the congestion state in the ATM switching unit at a source terminal side and the bottleneck path caused by the congestion state in the ATM switching unit at a destination terminal side can be efficiently predicted.

Figure 8:
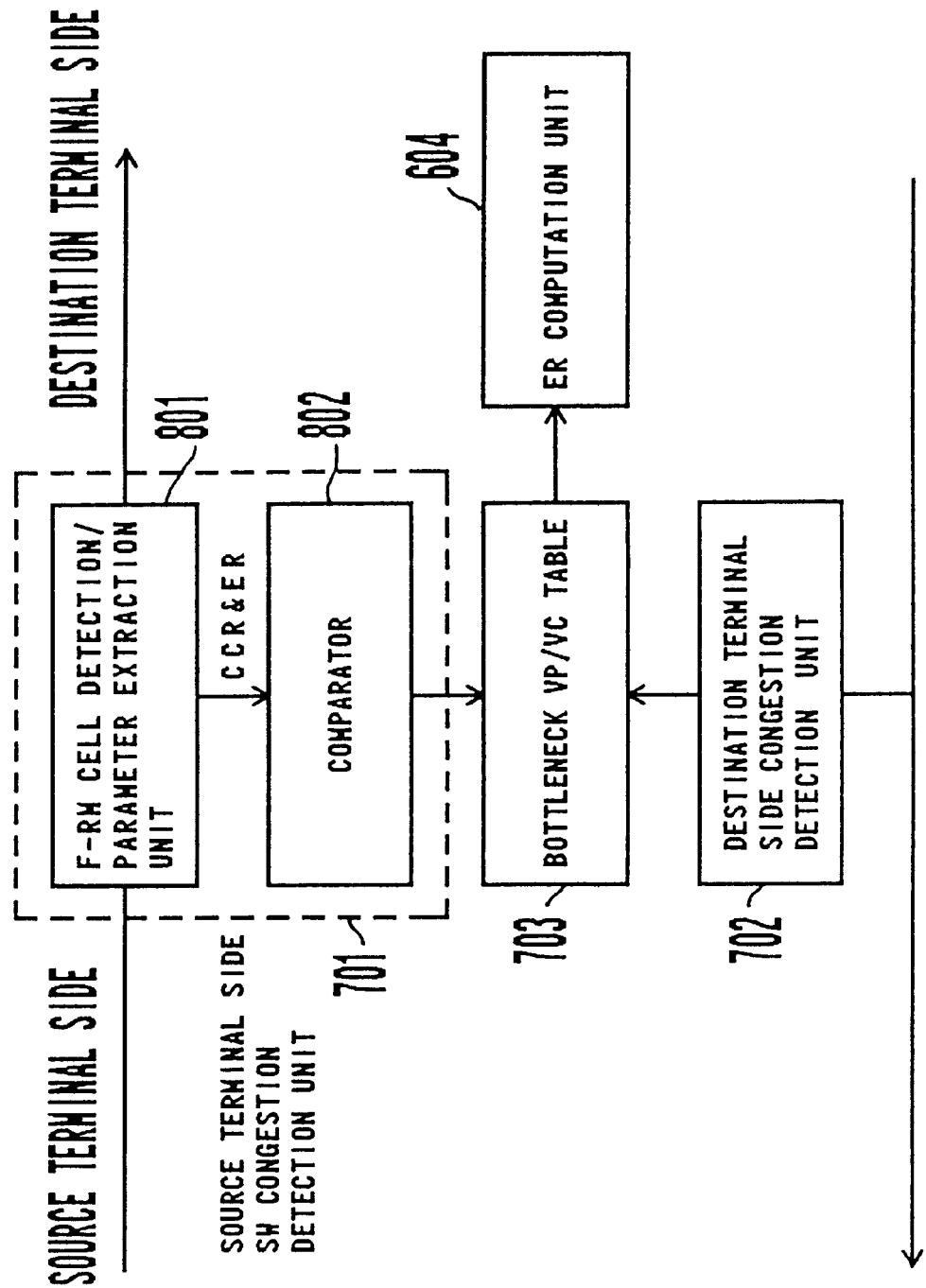
FIG. 8 shows the configuration (1) of the source terminal SW congestion detection unit according to the first embodiment of the present invention.

FIG. 8 shows the practical configuration (1) of the source terminal side SW congestion detection unit 701 shown in FIG. 7.

In FIG. 8, an F-RM cell detection/parameter extraction unit 801 detects an F-RM for each logic circuit, and extracts a current cell rate CCR (hereinafter referred to as a CCR value) and an ER value set therein. The CCR value indicates an actual transmission rate of the source terminal, and the ER value is an explicit rate indicated by the ATM switching unit at the source terminal side before the ATM switching unit containing the F-RM cell detection/parameter extraction unit 801.

A comparator 802 detects a congestion state in the ATM switching unit at the source terminal side by comparing the CCR value with the ER value extracted by the F-RM cell detection/parameter extraction unit 801 for each logic circuit.

Practically, the comparator 802 determines that congestion exists in the ATM switching unit at the source terminal side when CCR value >ER value can be expressed for each VPI/VCI corresponding to the logic circuit notified by the F-RM cell detection/parameter extraction unit 801, and sets a bottleneck flag at an address corresponding to the above described VPI/VCI in the bottleneck VP/VC table 703. The comparator 802 determines that congestion does not exist in the ATM switching unit at the source terminal side when CCR value $\leq$ ER value can be expressed, and resets a bottleneck flag at an address corresponding to the above described VPI/VCI in the bottleneck VP/VC table 703.

With the practical configuration shown in FIG. 8, a logic circuit in which a congestion state is detected by the ATM switching unit at the source terminal side is specified.

Figure 9:
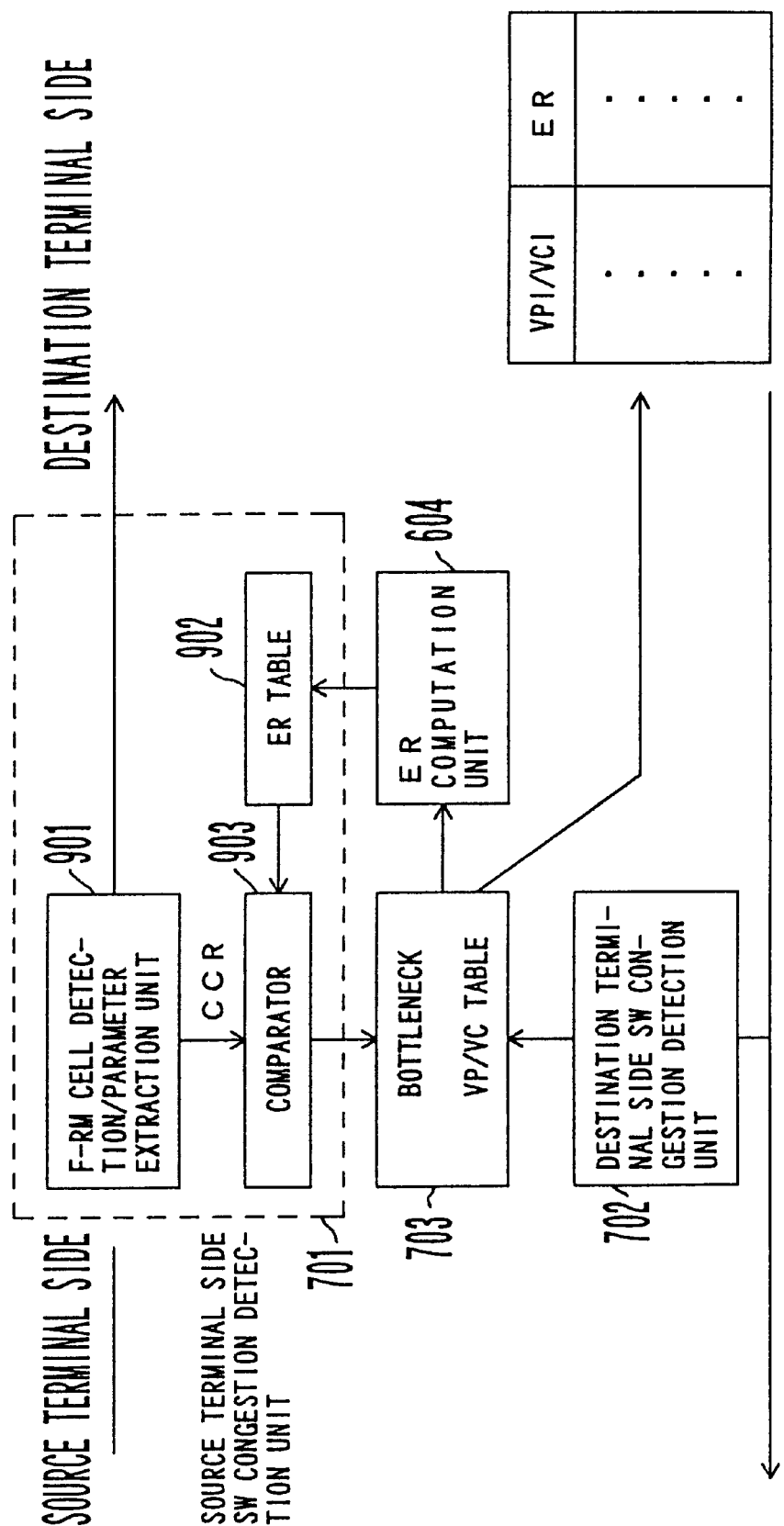
FIG. 9 shows the configuration (2) of the source terminal SW congestion detection unit according to the first embodiment of the present invention.

FIG. 9 shows another practical configuration (2) of the source terminal side SW congestion detection unit 701 shown in FIG. 7.

In FIG. 9, an F-RM cell detection/parameter extraction unit 901 detects an F-RM cell for each logic circuit, and extracts the CCR value set therein.

An ER table 902 stores an ER value written by the ER computation unit 604 (FIG. 6) to a B-RM cell for each logic circuit.

A comparator 903 detects a congestion state in the ATM switching unit at the source terminal side by comparing the CCR value extracted by the F-RM cell detection/parameter extraction unit 901 with the ER value stored by the ER table 902 for each logic circuit.

Practically, the comparator 903 determines that a congestion state exists in the ATM switching unit at the source terminal side when the above described ER value is larger than the CCR value (ER value >CCR value) for each VPI/VCI corresponding to the logic circuit notified by the F-RM cell detection/parameter extraction unit 901, and sets a bottleneck flag at the address corresponding to the above described VPI/VCI in the bottleneck VP/VC table 703. On the other hand, the comparator 903 determines that a congestion state does not exist in the ATM switching unit at the source terminal side when the above described ER value is equal to or smaller than the CCR value (ER value ≦CCR value), and resets a bottleneck flag at the address corresponding to the above described VPI/VCI in the bottleneck VP/VC table 703. That is, when the ER value is larger than the CCR value (ER value >CCR value), the congestion state is detected in the ATM switching unit at the source terminal side, and the ER value in the B-RM cell is set again to a furthermore smaller value. Then, the source terminal which has received the B-RM cell sets a smaller CCR value in the F-RM cell transmitted by the source terminal.

With the practical configuration shown in FIG. 9, as in the case shown in FIG. 8, a logic circuit in which a congestion state is detected by the ATM switching unit at the source terminal side can be specified.

Figure 10:
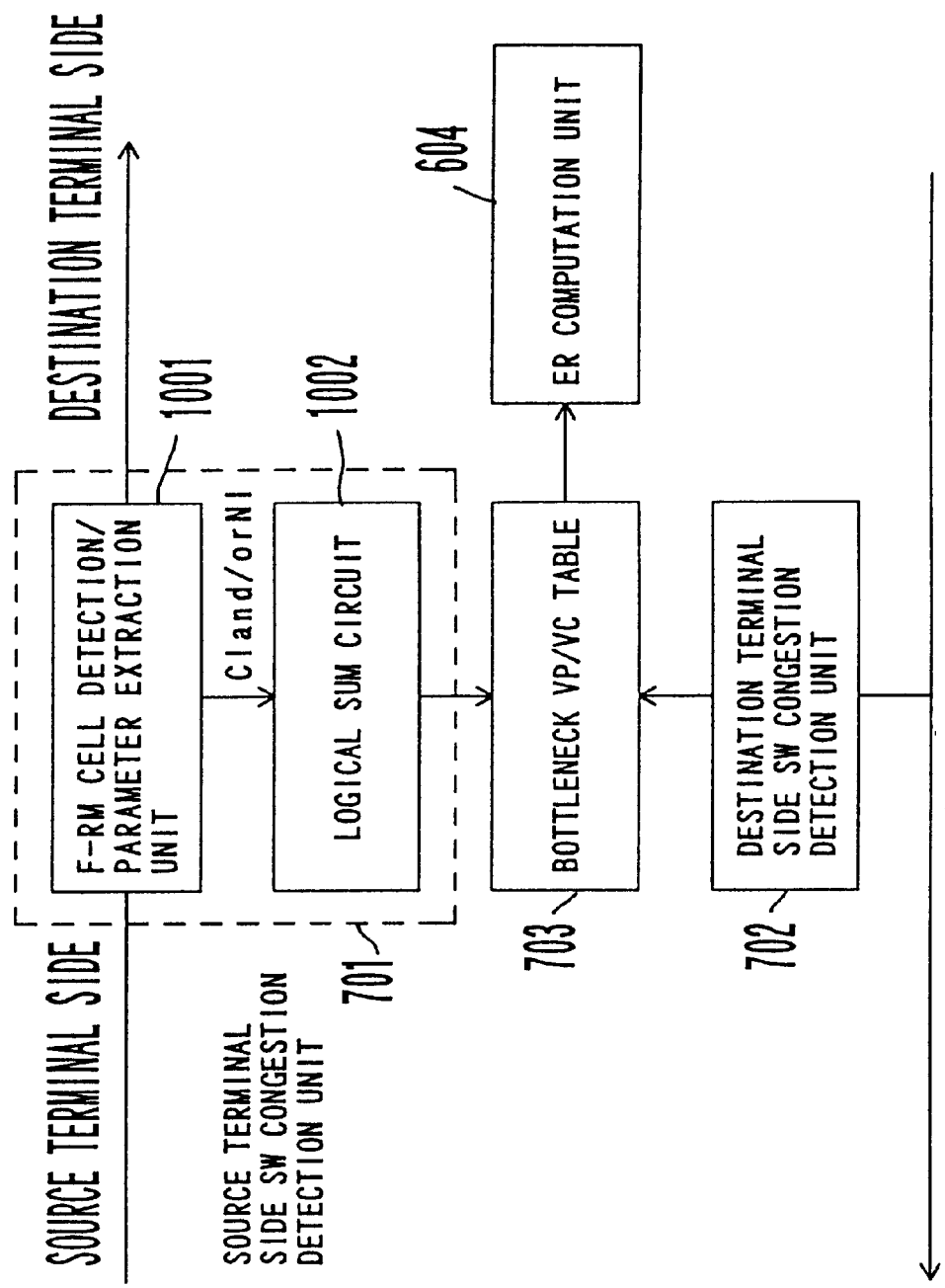
FIG. 10 shows the configuration (3) of the source terminal SW congestion detection unit according to the first embodiment of the present invention.

FIG. 10 shows a further practical configuration (3) of the source terminal SW congestion detection unit 701 shown in FIG. 7.

In FIG. 10, an F-RM cell detection/parameter extraction unit 1001 detects an F-RM cell and extracts a CI (Congestion Indicator) bit and an NI (No Increase) bit set therein for each logic circuit. A CI bit is set if the reduction in the allowed cell rate ACR of the source terminal is required. An NI bit is set when the reduction in the allowed cell rate ACR of the source terminal is not required but the allowed cell rate ACR should be maintained. The ATM switching unit at the source terminal side sets the CI bit or the NI bit in the F-RM cell when it detects a congestion state of a logic circuit corresponding to the F-RM cell.

Then, a logical sum (OR) circuit 1002 detects a congestion state in the ATM switching unit at the source terminal side by computing a logical sum (OR) of the CI bit and the NI bit extracted by the F-RM cell detection/parameter extraction unit 1001 for each logic circuit.

Practically, the logical sum circuit 1002 determines that a congestion state is detected in the ATM switching unit at the source terminal side when the above described logical sum is true, and sets a bottleneck flag at the address corresponding to the VPI/VCI in the bottleneck VP/VC table 703. The logical sum circuit 1002 determines that a congestion state is not detected in the ATM switching unit at the source terminal side when the above described logical sum is false, and resets a bottleneck flag at the address corresponding to the VPI/VCI in the bottleneck VP/VC table 703.

With the practical configuration shown in FIG. 10, as in the cases shown in FIG. 8 or 9, a logic circuit in which a congestion state is detected by the ATM switching unit at the source terminal side can be specified.

Figure 11:
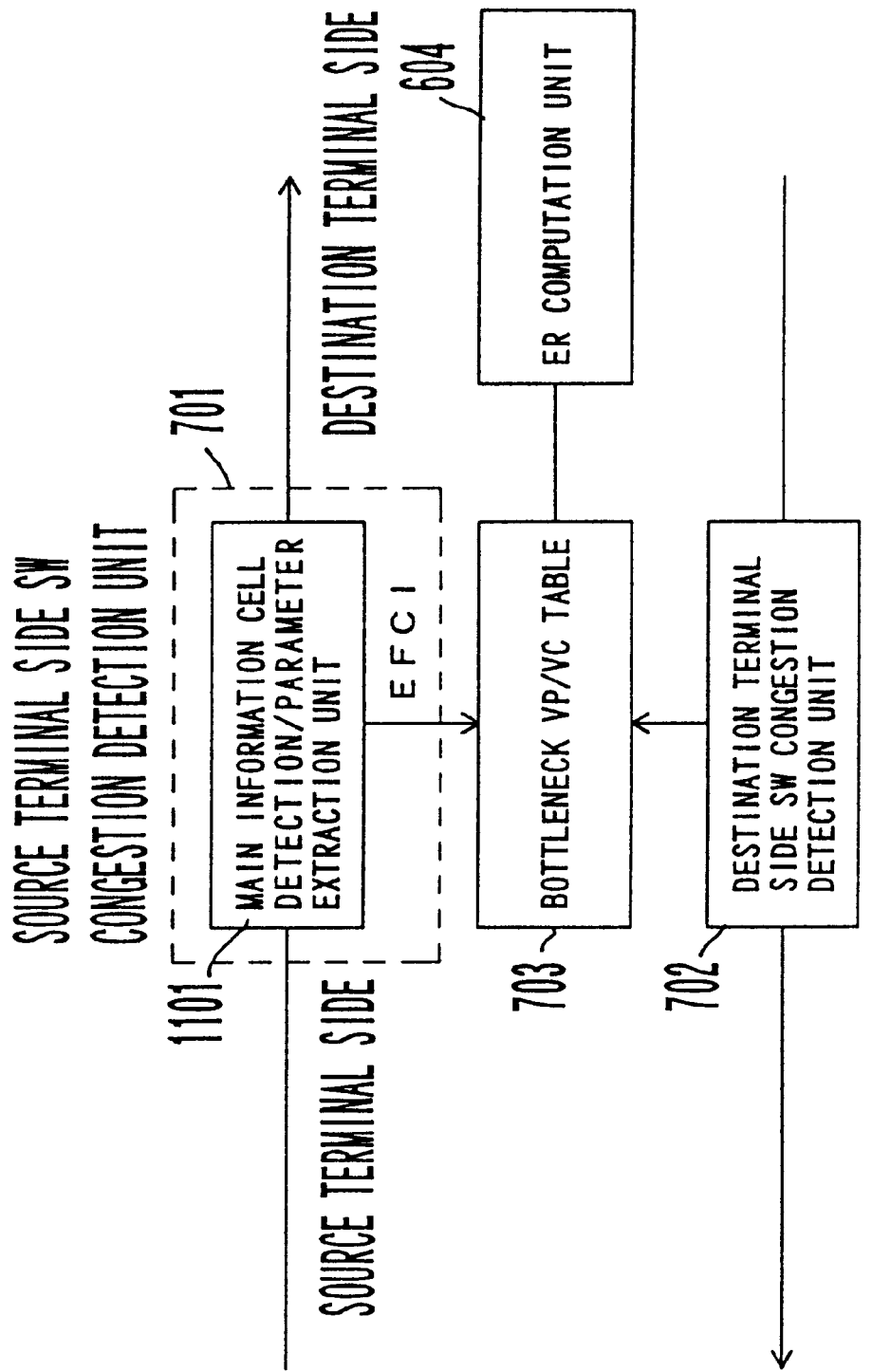
FIG. 11 shows the configuration (4) of the source terminal SW congestion detection unit according to the first embodiment of the present invention.

FIG. 11 shows a further practical configuration (4) of the source terminal side SW congestion detection unit 701 shown in FIG. 7.

First, the ATM switching unit at the source terminal side sets an EFCI bit in a main information cell passing through the ATM switching unit in a congestion state to pass the cell. Then, as shown in FIG. 11, a main information cell detection/parameter extraction unit 1101 detects a congestion state in the ATM switching unit at the source terminal side by detecting a main information cell and extracting an explicit forward congestion indicator (EFCI) bit therefrom for each logic circuit.

At this time, the main information cell detection/parameter extraction unit 1101 sets a bottleneck flag at an address corresponding to the above described VPI/VCI in the bottleneck VP/VC table 703.

With the practical configuration shown in FIG. 11, like the cases shown in FIGS. 8 through 10, a logic circuit in which a congestion state is detected by the ATM switching unit at the source terminal side can be specified.

FIG. 12 shows a practical configuration (1) of the destination terminal side SW congestion detection unit 702 shown in FIG. 7.

In FIG. 12, a B-RM cell detection/parameter extraction unit 1201 detects a B-RM cell and extracts an ER value set therein for each logic circuit.

An ER table 1202 stores an ER value written by the ER computation unit 604 (FIG. 6) to the F-RM cell for each logic circuit.

A comparator 1203 detects a congestion state in the ATM switching unit at the destination terminal side by comparing the ER value extracted by the B-RM cell detection/parameter extraction unit 1201 with the ER value stored in the ER table 1202 for each logic circuit.

Practically, the comparator 1203 determines that congestion exists in the ATM switching unit at the destination terminal side when the ER value in the above described ER table 1202 is larger than the above extracted ER value for each VPI/VCI corresponding to the logic circuit notified by the B-RM cell detection/parameter extraction unit 1201, and sets a bottleneck flag at an address corresponding to the above described VPI/VCI in the bottleneck VP/VC table 703. The comparator 1203 determines that congestion does not exist in the ATM switching unit at the destination terminal side when the ER value in the above described ER table 1202 is equal to or smaller than the above extracted ER value, and resets a bottleneck flag at an address corresponding to the above described VPI/VCI in the bottleneck VP/VC table 703. That is, since the congestion exists in the ATM switching unit at the destination terminal side when the ER value in the above described ER table 1202 is larger than the above extracted ER value, an ER value smaller than the ER value in the F-RM cell is set again in the B-RM cell.

With the practical configuration shown in FIG. 12, a logic circuit in which a congestion state is detected by the ATM switching unit at the destination terminal side is specified.

FIG. 13 shows another practical configuration (2) of the destination terminal side SW congestion detection unit 702 shown in FIG. 7.

In FIG. 13, a B-RM cell detection/parameter extraction unit 1301 detects a B-RM cell, and extracts the CI bit set therein for each logic circuit.

A CI table 1302 stores a CI bit written by the congestion detection unit 603 (FIG. 6) to the F-RM cell for each logic circuit.

A comparator 1303 detects a congestion state in the ATM switching unit at the destination terminal side by comparing the CI bit extracted by the B-RM cell detection/parameter extraction unit 1301 with the CI bit stored by the CI table 1302 for each logic circuit.

Practically, the comparator 1303 determines that a congestion state exists in the ATM switching unit at the destination terminal side when the above extracted CI bit =1 and the CI bit in the CI table 1302 =0 for each VPI/VCI corresponding to the logic circuit notified by the B-RM cell detection/parameter extraction unit 1301, and sets a bottleneck flag at the address corresponding to the above described VPI/VCI in the bottleneck VP/VC table 703. On the other hand, the comparator 1303 determines that a congestion state does not exist in the ATM switching unit at the destination terminal side when the conditions other than the above described conditions are expressed, and resets a bottleneck flag at the address corresponding to the above described VPI/VCI in the bottleneck VP/VC table 703. That is, when the above extracted CI bit =1 and the CI bit in the CI table 1302 =0, the congestion state is detected in the ATM switching unit at the destination terminal side, thereby setting the CI bit in the B-RM cell.

With the practical configuration shown in FIG. 13, a logic circuit in which a congestion state is detected by the ATM switching unit at the destination terminal side is specified as in the case shown in FIG. 12.

Second Preferred Embodiment

Figure 14:
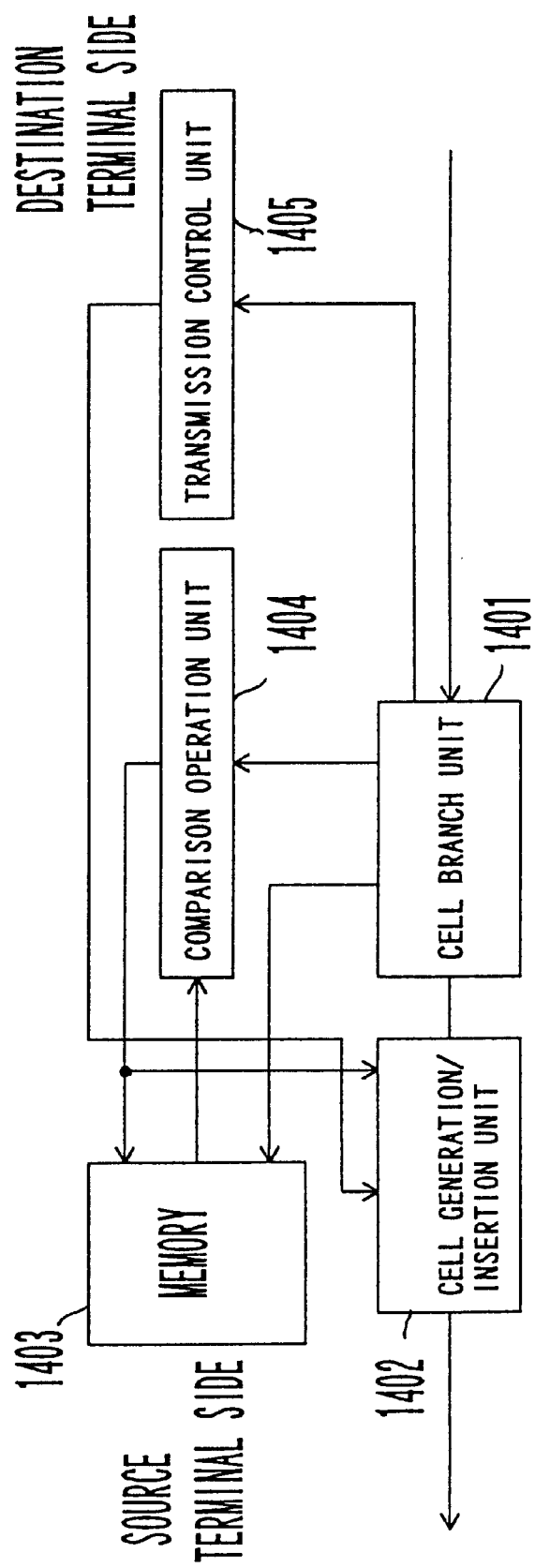
FIG. 14 shows the configuration (1) according to the second embodiment of the present invention.
Figure 15:
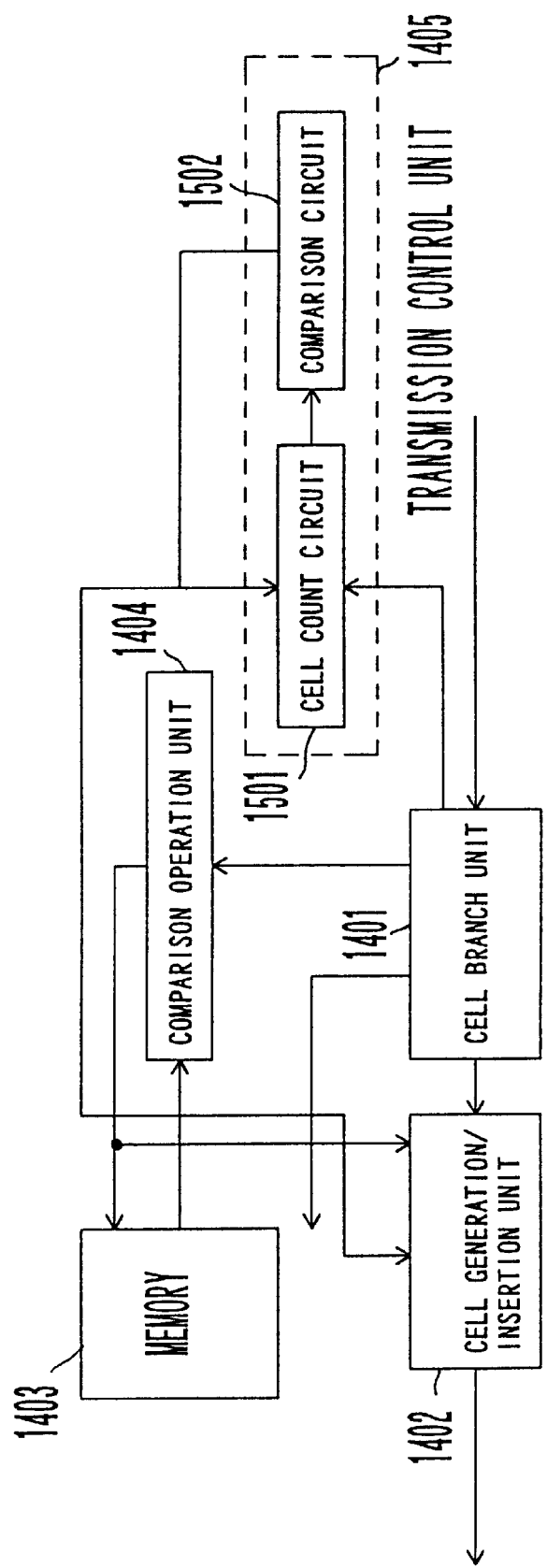
FIG. 15 shows the configuration (2) according to the second embodiment of the present invention.

FIGS. 14 and 15 show the second preferred embodiment of the present invention. The second embodiment aims at solving the second problem explained in the description of the related art.

In FIG. 14, a cell branch unit 1401 extracts and terminates the B-RM cell transferred through the backward circuit for each logic circuit which uses the multi-cast ABR service.

Practically, the cell branch unit 1401 has logic circuit setting information of a multi-cast set by a control unit not shown in FIG. 14. The logic circuit setting information can be, for example, the VPI/VCI of the logic circuit, the number of multi-casts, etc. The cell branch unit 1401 identifies, extracts, and terminates, based on the header, protocol identifier, etc., the B-RM cell transferred through the backward physical circuit for each logic circuit which uses the multi-cast ABR service according to the above described setting information. The cell branch unit 1401 provides the access address corresponding to the VPI/VCI added to the extracted B-RM cell for the memory 1403, provides the contents of the ER value, CI bit, etc. stored in the B-RM cell for the comparison operation unit 1404, and provides the detection signal of the B-RM cell having the above described VPI/VCI for the cell count circuit 1501 (FIG. 15) in the transmission control unit 1405. The cell branch unit 1401 passes a B-RM cell of the logic circuit which uses the ABR service of the point-to-point communications.

The memory 1403 is random access memory (RAM) for storing the contents of one B-RM cell for each logic circuit which uses the multi-cast ABR service.

Practically, the memory 1403 comprises RAM containing an area in which the contents of one B-RM cell are stored for each VPI/VCI of a logic circuit. Providing from the cell branch unit 1401 to the memory 1403 an access address corresponding to the VPI/VCI added to an extracted B-RM cell makes the contents of one B-RM cell stored in the memory 1403 corresponding to the logic circuit having the VPI/VCI to be read from the memory 1403 to the comparison operation unit 1404.

The comparison operation unit 1404 performs a comparison operation for each logic circuit which uses a multi-cast ABR service on the contents of the B-RM cell stored in the memory 1403 and the contents of the B-RM cell corresponding to the above described logic circuit and arriving at the cell branch unit 1401, and writes the comparison operation result to the storage area corresponding to the above described access address in the memory 1403.

Practically, the comparison operation unit 1404 obtains a logical sum of their CI bits, performs a collating operation on their ER values and selects a smaller value, and writes the comparison result to the storage area corresponding to the access address in the memory 1403. Therefore, if it is indicated that, for example, a CI bit is set and a congestion state occurs about the stored contents in the memory 1403 of each logic circuit which uses the multi-cast ABR service, then the indication is maintained until the end of the current cell count period counted by the cell count circuit 1501, and the ER value indicates the minimum cell transmission rate in the current cell count period.

The transmission control unit 1405 comprises the cell count circuit 1501 and the comparison circuit 1502 as shown in FIG. 15.

The cell count circuit 1501 counts the number of arriving B-RM cells at the cell branch unit 1401 for each logic circuit which uses the multi-cast ABR service based on the detection signal of a B-RM cell of each VPI/VCI notified by the cell branch unit 1401.

The comparison circuit 1502 compares the count value corresponding to the logic circuit by the cell count circuit 1501 with a predetermined value for each logic circuit which uses the multi-cast ABR service, and, if the comparison indicates a matching result, clears the count value of the cell count circuit 1501 corresponding to the above described logic circuit and simultaneously notifies the cell generation/insertion unit 1402 of a trigger signal specifying the transmission of the B-RM cell corresponding to the above described logic circuit.

Each time the cell generation/insertion unit 1402 is notified by the transmission control unit 1405 of a trigger signal specifying the transmission of the B-RM cell corresponding to one logic circuit which uses the multi-cast ABR service, the cell generation/insertion unit 1402 reads from the memory 1403 the contents of one B-RM cell stored corresponding to the logic circuit, generates a new B-RM cell which stores the contents, and inserts the cell into the backward physical circuit. Then, the cell generation/insertion unit 1402 clears the contents stored in the B-RM cell corresponding to the above described logic circuit in the memory 1403.

Assuming that the number of multi-casts is S for one logic circuit which uses the multi-cast ABR service with the above described configurations according to the second preferred embodiment of the present invention, one B-RM cell can be generated and transmitted each time the S B-RM cells corresponding to the logic circuit are terminated. Thus, the band of the backward physical circuit can be effectively used.

Third Preferred Embodiment

FIG. 16 shows the configuration according to the third preferred embodiment of the present invention. Like the second preferred embodiment of the present invention, the third embodiment aims at solving the second problem explained in the description of the related art.

In FIG. 16, the portion assigned the same number as the portion in FIG. 14 functions similarly as shown in FIG. 14.

The configuration shown in FIG. 16 is different from that shown in FIG. 14 in that the transmission control unit 1405' corresponding to the transmission control unit 1405 shown in FIG. 14 comprises the timer unit 1601.

For each logic circuit which uses the multi-cast ABR service, the timer unit 1601 notifies the cell generation/insertion unit 1402 of the trigger signal indicating the transmission of the B-RM cell corresponding to the logic circuit at time intervals at which a plurality of B-RM cells arrive.

FIG. 17 shows the configuration of the timer unit 1601 shown in FIG. 16.

In FIG. 17, a counter 1701 counts the value of a clock CLK.

A setting table 1702 has a data configuration shown in FIG. 18, and stores a generation and insertion time expressed as a counter value of the counter 1701 at which a next B-RM cell is generated by the cell generation/insertion unit 1402 and inserted into the backward physical circuit for each logic circuit (VC, that is, a virtual connection) which uses the multi-cast ABR service. It also stores the B-RM cell insertion intervals specified by the number of clocks CLK.

A comparison circuit 1703 compares the counter value of the counter 1701 with the generation and insertion time for each logic circuit in the setting table, notifies, if a matching result is detected in a logic circuit, the cell generation/insertion unit 1402 shown in FIG. 16 of the trigger signal indicating the transmission of the B-RM cell corresponding to the logic circuit, and writes a value obtained by adding the insertion intervals corresponding to the logic circuit in the setting table to the counter value of the current counter 1701 at a storage position corresponding to the logic circuit in the setting table 1702 as the generation and insertion time corresponding to the logic circuit. In this example, the counter 1701 can count up to a large value compared with the maximum insertion intervals. When it counts to the maximum value, the counter value is returned to 0 and the count is resumed.

Assuming that the number of multi-casts is S for one logic circuit which uses the multi-cast ABR service with the above described configurations according to the third embodiment of the present invention, one B-RM cell can be generated and transmitted at time intervals at which the S B-RM cells corresponding to the logic circuit are terminated. Thus, the band of the backward physical circuit can be effectively used.

Fourth Preferred Embodiment

Figure 19:
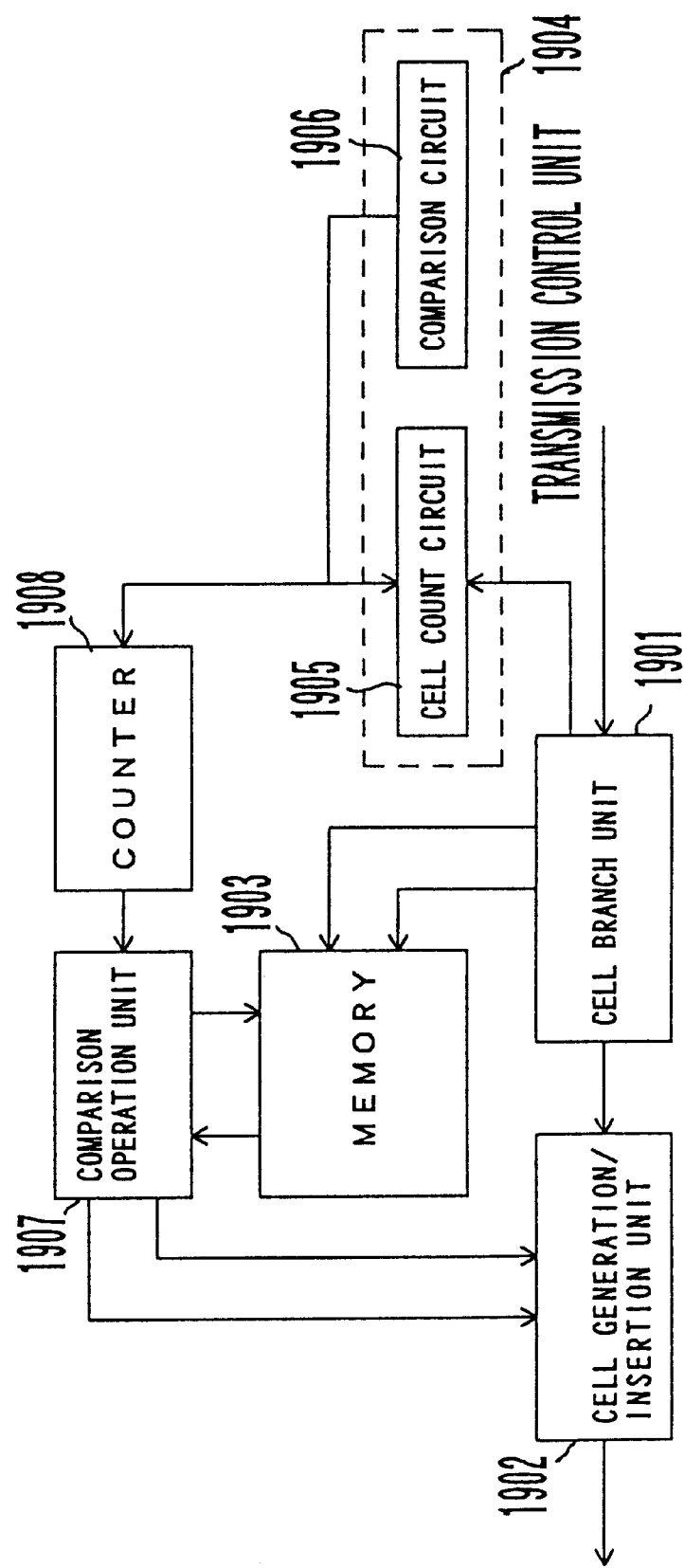
FIG. 19 shows the configuration according to the fourth embodiment of the present invention.

FIG. 19 shows the configuration according to the fourth preferred embodiment of the present invention. Like the second preferred embodiment of the present invention, the fourth embodiment aims at solving the second problem explained in the description of the related art.

According to the second embodiment of the present invention shown in FIG. 14, the memory 1403 stores the contents of one B-RM cell for each logic circuit. Each time a B-RM cell arrives at the cell branch unit 1401, the contents of the arriving B-RM cell are compared with the contents of the B-RM cell stored in the memory 1403, and the latest contents of the B-RM cell can be obtained for each logic circuit. In this method, the storage capacity of the memory 1403 can be small, but a load is required to perform a comparison operation each time a B-RM cell arrives.

On the other hand, according to the fourth preferred embodiment of the present invention shown in FIG. 19, a plurality of B-RM cells sequentially arriving at the cell branch unit 1401 are stored in the memory 1903, and a comparison operation is performed on the contents of the plurality of stored B-RM cells when the cell generation/insertion unit 1402 sends a B-RM cell for each logic circuit. Thus, the storage capacity of the memory 1903 increases but the process load when a B-RM cell arrives can be successfully reduced.

In FIG. 19, the cell branch unit 1901 sequentially extracts and terminates the B-RM cells transferred through the backward physical circuit and sequentially writes them to the memory 1903 for each logic circuit which uses the multi-cast ABR service. That is, unlike the second embodiment shown in FIG. 14, the memory 1903 can bold the contents of a plurality of B-RM cells for each logic circuit which uses the multi-cast ABR service.

Practically, the cell branch unit 1901 identifies, extracts, and terminates the B-RM cells transferred through the backward physical circuit based on the header, protocol identifier, etc. according to the logic circuit setting information about the multi-cast set by the control unit, not shown in FIG. 19, for each logic circuit which uses the multi-cast ABR service. The cell branch unit 1901 adds to the memory 1403 the access address corresponding to the VPI/VCI added to the extracted B-RM cell, provides the extracted B-RM cell to the memory 1903, and simultaneously sends the detection signal of the B-RM cell having the VPI/VCI to the cell count circuit 1905 in the transmission control unit 1904. The cell branch unit 1901 passes the main information cell and the B-RM cells of the logic circuit which uses the ABR service in the one-to-one communications.

The memory 1903 stores the contents of a plurality of B-RM cells for each logic circuit which uses the multi-cast ABR service.

Practically, the memory 1903 comprises random access memory (RAM) having an area storing the contents of a plurality of B-RM cells for each VPI/VCI of a logic circuit. When the access address corresponding to the VPI/VCI added to the sequentially extracted B-RM cell is provided from the cell branch unit 1901 to the memory 1903, the contents of the B-RM cell simultaneously provided from the cell branch unit 1901 are written to the storage area of a plurality of B-RM cells corresponding to the above described VPI/VCI.

The transmission control unit 1904 comprises a cell count circuit 1905 and a comparison circuit 1906.

The cell count circuit 1905 counts the number of arriving B-RM cells at the cell branch unit 1901 according to the detection signal of the B-RM cell for each VPI/VCI notified by the cell branch unit 1901 for each logic circuit which uses the multi-cast ABR service.

The comparison circuit 1906 compares the count value of the cell count circuit 1905 corresponding to a logic circuit with a predetermined value for each logic circuit which uses the multi-cast ABR service. When the comparison indicates a matching result, the comparison circuit 1906 clears the count value of the cell count circuit 1905 corresponding to the logic circuit, and simultaneously sends a count trigger signal corresponding to the logic circuit to a counter 1908.

When the counter 1908 receives a count trigger signal corresponding to a predetermined logic circuit from the comparison circuit 1906, it sequentially sends trigger signals for a predetermined times to the comparison operation unit 1907.

The comparison operation unit 1907 sequentially retrieves the contents of a plurality of B-RM cells from the storage area corresponding to the logic circuit by accessing the memory 1903 each time it receives a trigger signal from the counter 1908, and performs a comparison operation on them. The comparison operation is the same as that performed by the comparison operation unit 1404 according to the second preferred embodiment of the present invention shown in FIG. 14. That is, a logical sum of CI bits is obtained among the plurality of B-RM cells, and the minimum ER value is computed.

When the comparison operation unit 1404 completes the comparison operation on the contents of the plurality of B-RM cells stored in the memory 1903 corresponding to the logic circuit, it transmits the operation result, that is, the contents of the B-RM cell to the cell generation/insertion unit 1902, and notifies the cell generation/insertion unit 1902 of a trigger signal indicating the transmission of the B-RM cell corresponding to the logic circuit.

The cell generation/insertion unit 1902 generates a B-RM cell having the contents notified by the comparison operation unit 1907, and inserts the cell into the backward physical circuit.

Fifth Preferred Embodiment

Figure 20:
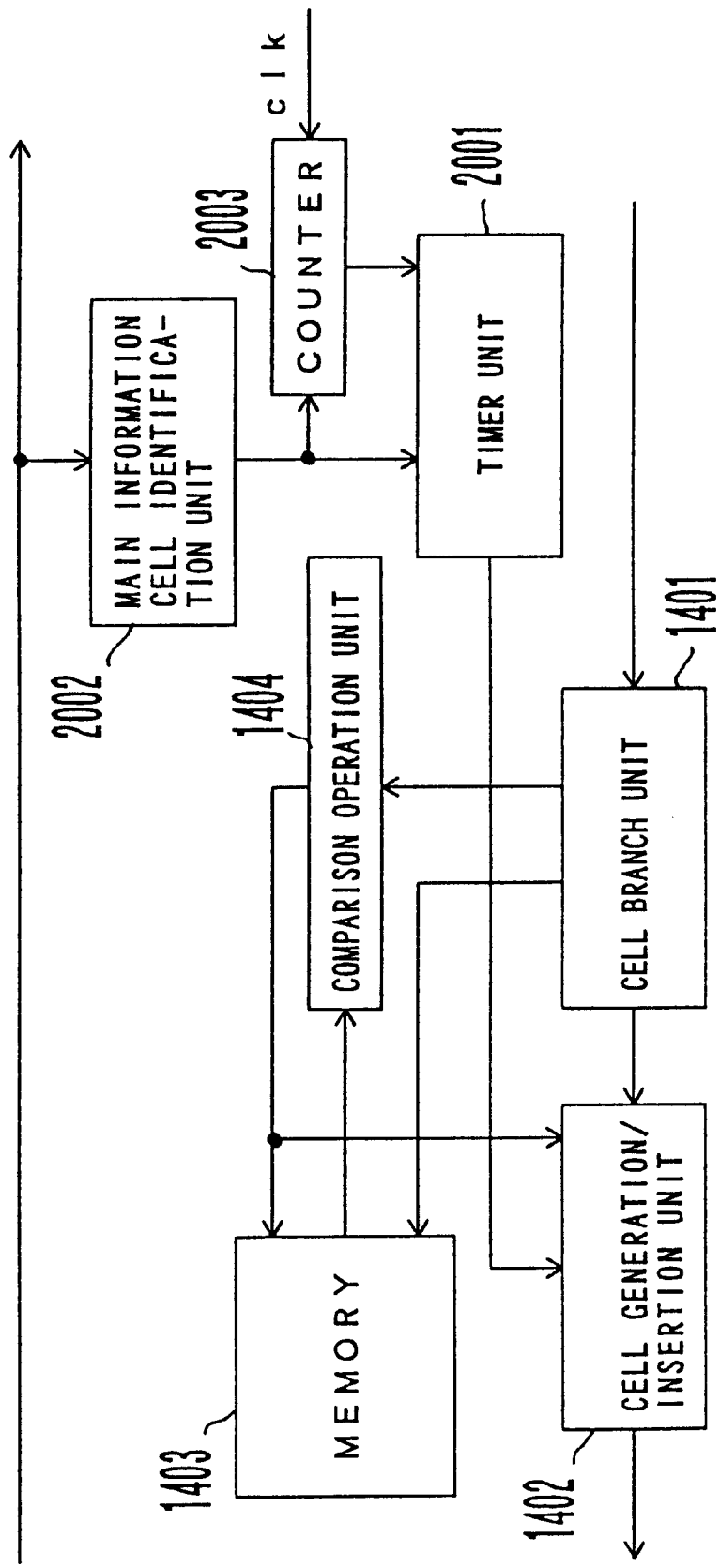
FIG. 20 shows the configuration according to the fifth embodiment of the present invention.

FIG. 20 shows the configuration of the fifth preferred embodiment of the present invention. Like the second preferred embodiment of the present invention, the fifth embodiment aims at solving the second problem explained in the description of the related art.

In FIG. 20, the portion assigned the same number as the portion according to the second and third embodiments of the present invention shown in FIGS. 14 and 16 similarly functions as shown in FIG. 14.

In the fifth preferred embodiment of the present invention shown in FIG. 20, as in the third preferred embodiment of the present invention shown in FIG. 16, a timer unit 2001 instructs the cell generation/insertion unit 1402 to send a B-RM cell corresponding to a logic circuit at predetermined time intervals for each logic circuit which uses the multi-cast ABR service to the backward physical circuit.

According to the third preferred embodiment of the present invention shown in FIG. 16, the time intervals set in the timer unit 1601 for each logic circuit, that is, the intervals of insertion into the setting table 1702 shown in FIG. 17, are expressed by a fixed value. However, the F-RM cell for each logic circuit is actually transmitted every predetermined number of main information cells (user cells) for the logic circuit. Therefore, it is desired that the number of B-RM cells is proportional to the number and the arrival time intervals of the main information cells.

The fifth preferred embodiment of the present invention shown in FIG. 20 has the following configuration.

First, the main information cell identification unit 2002 identifies the main information cell passing through the forward physical circuit, adds an identification signal as a reset signal to the counter 2003 and as a load signal to the timer unit 2001 for each logic circuit.

The counter 2003 counts the clock signal clk for each logic circuit. When the counter 2003 receives a reset signal from the main information cell identification unit 2002 for each logic circuit, it resets the count value after outputting the current count value corresponding to the logic circuit to the timer unit 2001.

The timer unit 2001 internally loads a count value corresponding to the logic circuit output from the counter 2003 when it receives a load signal from the main information cell identification unit 2002 for each logic circuit. Then, for each logic circuit, the timer unit 2001 adds up a predetermined number of counter values K1, K2, . . . , Kn sequentially loaded from the counter 2003, and sets the value mT obtained by multiplying the sum T=K1+K2+. . . +Kn by a predetermined number (m) as a time interval for each logic circuit.

The configurations and operations of the timer units 2001 other than the above described unit are identical to those according to the third preferred embodiment of the present invention shown in FIGS. 16 through 18.

With the configuration according to the fifth preferred embodiment of the present invention, the transmission timing of the B-RM cell for each logic circuit can be proportional to the arrival time intervals of a predetermined number of main information cells (user cells) for each logic circuit.

Sixth Preferred Embodiment

Figure 21:
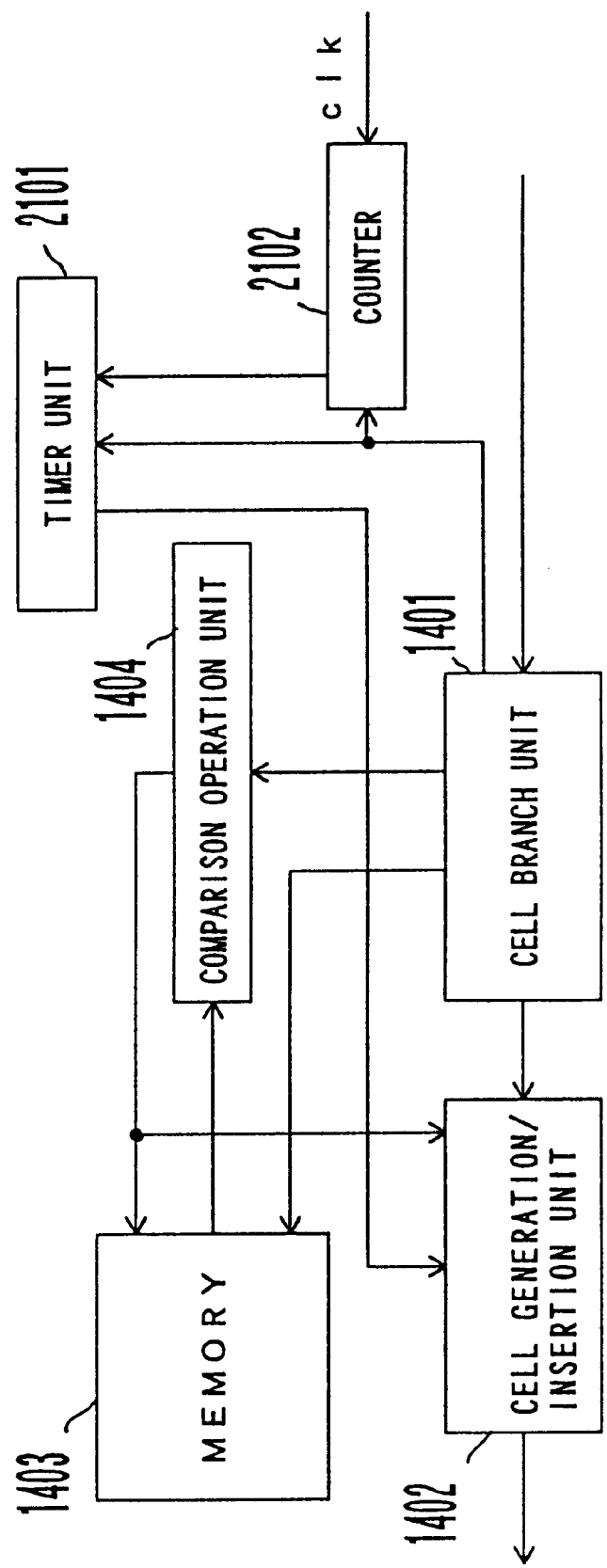
FIG. 21 shows the configuration according to the sixth embodiment of the present invention.

FIG. 21 shows the configuration according to the sixth preferred embodiment of the present invention. Like the second preferred embodiment of the present invention, the sixth preferred embodiment of the present invention aims at solving the second problem as explained in the description of the related art.

In FIG. 21, the portion assigned the same number as the portion according to the second and third embodiments of the present invention shown in FIGS. 14 and 16 similarly functions as shown in FIG. 14.

In the sixth preferred embodiment of the present invention shown in FIG. 21, as in the third preferred embodiment of the present invention shown in FIG. 16, a timer unit 2101 instructs the cell generation/insertion unit 1402 to send a B-RM cell corresponding to a logic circuit at predetermined time intervals for each logic circuit which uses the multi-cast ABR service.

However, in the sixth preferred embodiment of the present invention shown in FIG. 21, a counter 2102 counts the arrival time interval of the B-RM cell at the cell branch unit 1401, and sets the time interval corresponding to the arrival time interval in the timer unit 2101 for each logic circuit.

Practically, the cell branch unit 1401 identifies the B-RM cell passing through the backward physical circuit, adds an identification signal as a reset signal to the counter 2102 and as a load signal to the timer unit 2101 for each logic circuit.

The counter 2102 counts the clock signal clk for each logic circuit. When the counter 2102 receives a reset signal from the cell branch unit 1401 for each logic circuit, it resets the count value after outputting the current count value corresponding to the logic circuit to the timer unit 2101.

The timer unit 2101 internally loads a count value corresponding to the logic circuit output from the counter 2102 when it receives a load signal from the cell branch unit 1401 for each logic circuit. Then, for each logic circuit, the timer unit 2101 adds up a predetermined number of counter values q1, q2, . . . , qm sequentially loaded from the counter 2102, and sets the sum T=q1+q2+. . . +qm as a time interval for each logic circuit.

The configurations and operations of the timer units 2101 other than the above described unit are identical to those according to the third preferred embodiment of the present invention shown in FIGS. 16 through 18.

With the configuration according to the sixth preferred embodiment of the present invention, the transmission timing of the B-RM cell for each logic circuit can be proportional to the arrival time intervals of a predetermined number of B-RM cells for each logic circuit.

Seventh Preferred Embodiment

Figure 22:
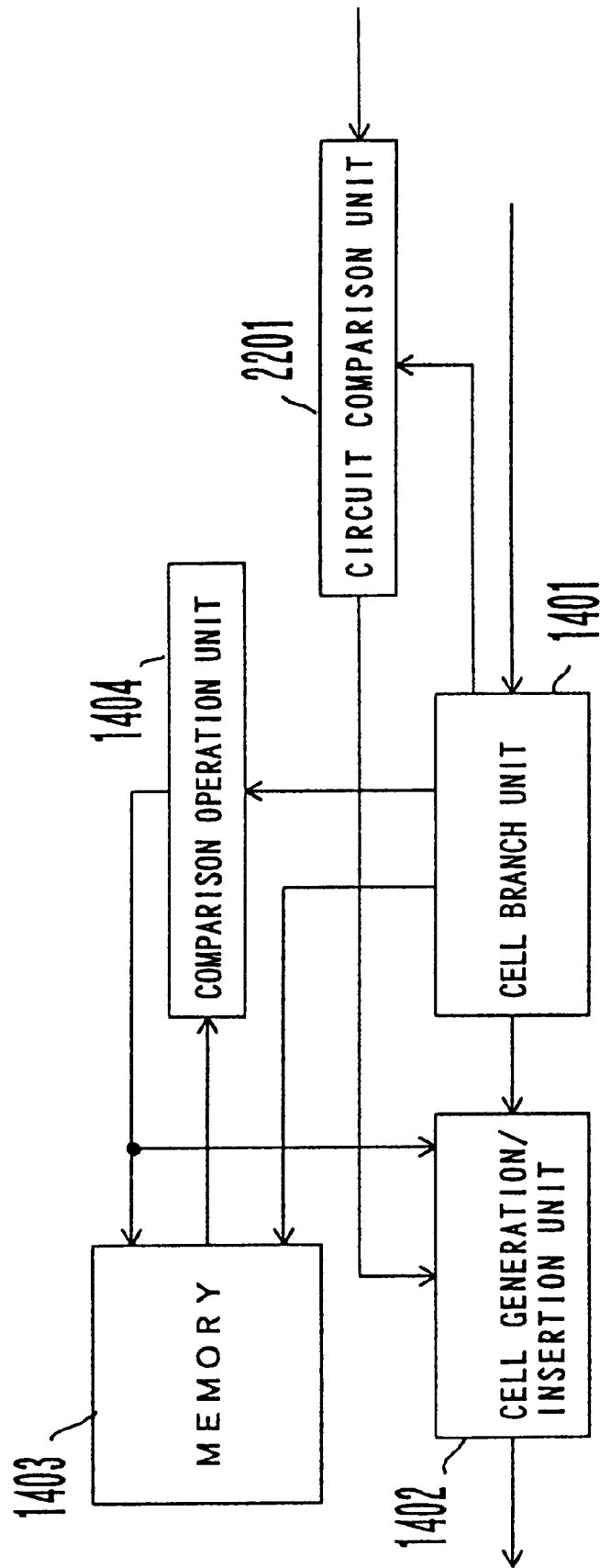
FIG. 22 shows the configuration according to the seventh embodiment of the present invention.

FIG. 22 shows the configuration according to the seventh preferred embodiment of the present invention. Like the second preferred embodiment of the present invention, the seventh preferred embodiment of the present invention aims at solving the second problem as explained in the description of the related art.

In FIG. 22, the portion assigned the same number as the portion according to the second embodiment of the present invention shown in FIG. 14 similarly functions as shown in FIG. 14.

The configuration shown in FIG. 22 is different from that shown in FIG. 14 in that the cell generation/insertion unit 1402 is instructed to transmit the B-RM cell for each logic circuit, not by the arrival of a predetermined number of B-RM cells for each logic circuit, but by the detection of the arrival of the B-RM cell of a specific logic circuit which uses the multi-cast ABR service.

When the cell branch unit 1401 identifies and extracts a B-RM cell of a specific logic circuit based on its header and protocol identifier, etc. in addition to the operations similar to those according to the second preferred embodiment of the present invention shown in FIG. 14, it notifies a circuit comparison unit 2201 of a detection signal indicating the detection of the B-RM cell of the specific signal.

The above described specific logic circuit can be, for example, the smallest-physical-band logic circuit (that is, a logic circuit easily entering a congestion state) or the smallest-delay logic circuit.

As described above, according to the seventh preferred embodiment of the present invention, the influence of a B-RM cell in a logic circuit having a broad band and a high cell transmission rate can be reduced by issuing to the cell generation/insertion unit 1402 an instruction to transmit a B-RM cell for each logic circuit when the arrival of the B-RM cell of a specific logic circuit using a multi-cast ABR service is detected.

Eighth Preferred Embodiment

Figure 23:
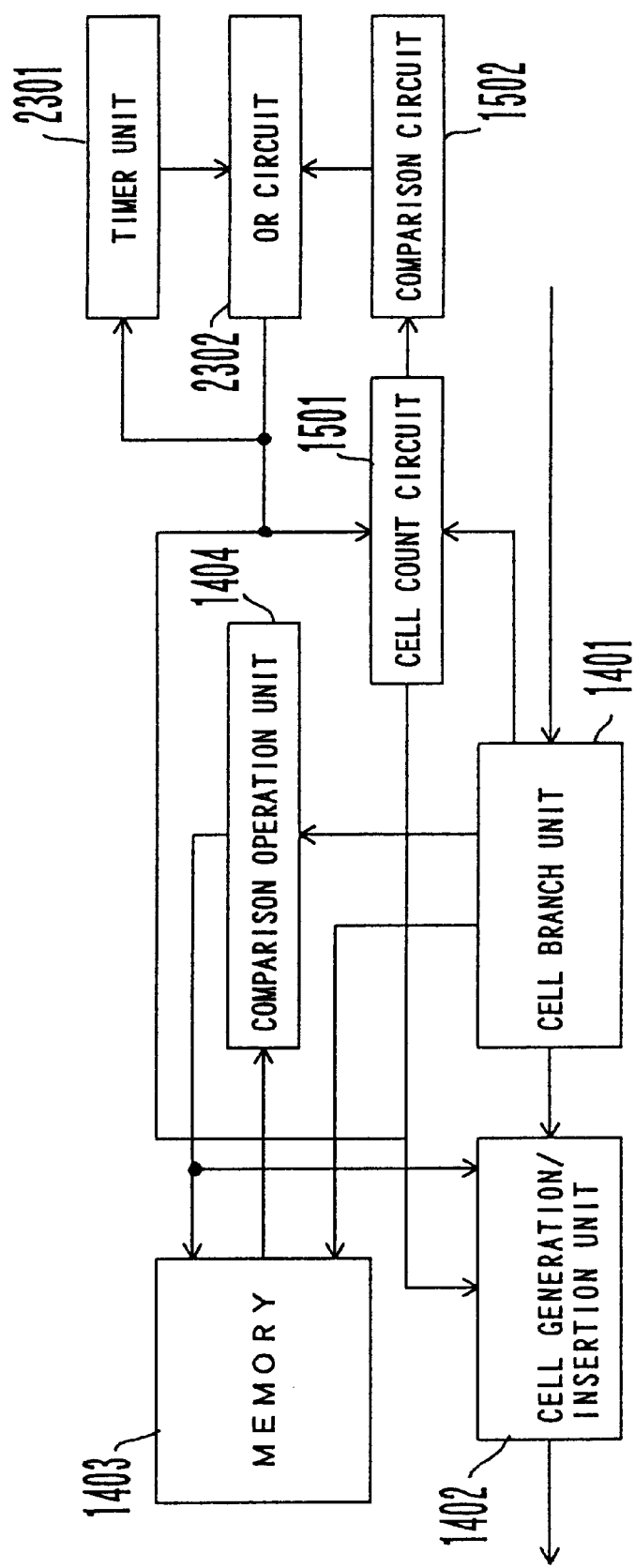
FIG. 23 shows the configuration according to the eighth embodiment of the present invention.

FIG. 23 shows the configuration according to the eighth preferred embodiment of the present invention. Like the second preferred embodiment of the present invention, the eighth preferred embodiment of the present invention aims at solving the second problem as explained in the description of the related art.

In FIG. 23, the portion assigned the same number as the portion according to the second embodiment of the present invention shown in FIG. 14 similarly functions as shown in FIG. 14.

The configuration shown in FIG. 23 is based on the configuration according to the second preferred embodiment of the present invention shown in FIG. 14. Therefore, basically as in the case shown in FIG. 14, an instruction is issued to the cell generation/insertion unit 1402 to send a B-RM cell for each logic circuit when a predetermined number of B-RM cells arrive for each logic circuit based on the operations of the cell count circuit 1501 and the comparison circuit 1502.

However, B-RM cells may not arrive or may arrive with considerable delay for some reason. Therefore, according to the eighth preferred embodiment of the present invention shown in FIG. 23, if a timer unit 2301 times out before the comparison circuit 1502 outputs an instruction to send a B-RM cell through the OR circuit 2302 after the timer unit 2301 is reset by the previous instruction from the OR circuit 2302 to send a B-RM cell, then the timer unit 2301 outputs an instruction to send the B-RM cell through the OR circuit 2302.

What is claimed is:

1. A cell rate control unit which is operated for a cell switching unit for self-switching a fixed-length cell according to routing information added to the cell, and varies a transmission rate of a cell in a source terminal by feeding back to the source terminal a congestion state in the cell switching unit using a resource management cell, said unit comprising:

bottleneck path prediction means for predicting a bottleneck path, that is, a logic circuit having a transmission rate limited by a cell switching unit other than a predetermined cell switching unit, the logic circuit being one of logic circuits using a predetermined physical circuit in the predetermined cell switching unit, wherein said bottleneck path prediction means predicts a bottleneck by comparing a current cell rate indicating a transmission rate of a current cell to an explicate cell rate indicating a transmission rate of a cell specified for a source terminal; and rate control information setting means for setting rate control information in a resource management cell transferred through the physical circuit based on a state of the logic circuit using the physical circuit, the congestion state in a switch in the predetermined cell switching unit, and information about the bottleneck path predicted by said bottleneck path prediction means.

2. The unit according to claim 1, wherein said bottleneck path prediction means comprises:
source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means.

3. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

bottleneck path prediction means for predicting a bottleneck path, that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means; and wherein said bottleneck path prediction means comprises:
source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said source terminal side congestion state detection means comprises:

first forward resource management cell detection/parameter extraction means for detecting, for each logic circuit, a forward resource management cell transferred through the physical circuit from the source terminal to the predetermined cell switching unit, and extracting from the forward resource management cell a current cell rate indicating the transmission rate of a current cell and an explicit rate indicating the transmission rate of a cell specified for the source terminal; and first comparison means for detecting, for each logic circuit, as the bottleneck path the logic circuit in the congestion state in the cell switching unit at the source terminal side by comparing the current cell rate with the explicit rate both extracted by said first forward resource management cell detection/parameter extraction means.

4. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

bottleneck path prediction means for predicting a bottleneck path, that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means; and wherein said bottleneck path prediction means comprises:

source terminal side congestion state detection means for detecting as a bottleneck path a logic circuit in the congestion state in a cell switching unit at the source terminal side of the Redetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said source terminal side congestion state detection means comprises:

second forward resource management cell detection/parameter extraction means for detecting, for each logic circuit, a forward resource management cell transferred through the physical circuit from the source terminal to the predetermined cell switching unit, and extracting from the forward resource management cell a current cell rate indicating the transmission rate of a current cell;

first explicit rate storage means for storing, for each logic circuit, an explicit rate currently set by said rate control information setting means in a backward resource management cell transferred through the physical circuit from the destination terminal to the predetermined cell switching unit; and second comparison means for detecting, for each logic circuit, as the bottleneck path the logic circuit in the congestion state in the cell switching unit at the source terminal side by comparing the current cell rate extracted by said second forward resource management cell detection/parameter extraction means with a current explicit rate stored in said first explicit rate storage means.

5. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

bottleneck path prediction means for predicting a bottleneck path, that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means; and wherein said bottleneck path prediction means comprises:

source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said source terminal side congestion state detection means comprises:

third forward resource management cell detection/parameter extraction means for detecting, for each logic circuit, a forward resource management cell transferred through the physical circuit from the source terminal to the predetermined cell switching unit, and extracting congestion indicator information indicating the congestion state from the forward resource management cell; and third comparison means for detecting, for each logic circuit, as the bottleneck path the logic circuit in the congestion state in the cell switching unit at the source terminal side according to the congestion indicator information extracted by said third forward resource management cell detection/parameter extraction means.

6. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

bottleneck path prediction means for predicting a bottleneck path, that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means; and wherein said bottleneck path prediction means comprises:
source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said source terminal side congestion state detection means comprises:

main information cell detection/parameter extraction means for detecting, for each logic circuit, a main information cell transferred through the physical circuit from the source terminal to the predetermined cell switching unit, and extracting explicit forward congestion indicator information indicating the congestion state from the main information cell; and fourth comparison means for detecting, for each logic circuit, as the bottleneck path the logic circuit in the congestion state in the cell switching unit at the source terminal side according to explicit forward congestion indicator information extracted by said main information cell detection/parameter extraction means.

7. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

bottleneck path prediction means for predicting a bottleneck path, that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means; and wherein said bottleneck path prediction means comprises:
source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said destination terminal side congestion state detection means comprises:

first backward resource management cell detection/parameter extraction means for detecting, for each logic circuit, a backward resource management cell transferred through the physical circuit from the destination terminal to the predetermined cell switching unit, and extracting from the backward resource management cell an explicit rate indicating the transmission rate of a cell specified for the source terminal;

second explicit rate storage means for storing, for each logic circuit, an explicit rate currently set by said rate control information setting means in a forward resource management cell transferred through the physical circuit from the source terminal to the predetermined cell switching unit; and fifth comparison means for detecting, for each logic circuit, as the bottleneck path the logic circuit in the congestion state in the cell switching unit at the destination terminal side by comparing the explicit rate extracted by said first backward resource management cell detection/parameter extraction means with a current explicit rate stored in said second explicit rate storage means.

8. A cell rate control unit which is operated in a cell switching unit for self-switching a fixed-length cell according to outing information added to the cell, and varies a transmission rate of a cell in a source terminal by feeding back to the source terminal a congestion state in a cell switching unit using a resource management cell, said unit comprising:

bottleneck path prediction means for predicting a bottleneck path that is, a logic circuit whose transmission rate is limited by a cell switching unit other than a predetermined cell switching unit, the logic circuit being one of logic circuits using a predetermined physical circuit in the predetermined cell switching unit;

rate control information setting means for setting rate control information in a resource management cell transferred through the physical circuit based on a state of the logic circuit using the physical circuit, the congestion station in a switch in the predetermined cell switching unit, and information about the bottleneck path predicted by said bottleneck path prediction means, and wherein said bottleneck path prediction means comprises:

source terminal side congestion state detection means for detecting as a bottleneck path a logic circuit in the congestion state in a cell switching unit at the source terminal side of the predetermined cell switching unit, and destination terminal side congestion state detection means for detecting as a bottleneck path a logic circuit in the congestion state in a cell switching unit at the destination terminal side of the predetermined cell switching unit; and said rate control information setting means sets the rate control information in the resource management cell transferred through the physical circuit according to information about the bottleneck path detected by said source terminal side congestion state detection means or said destination terminal side congestion state detection means; and said destination terminal side congestion state detection means comprises:

second backward resource management cell detection/parameter extraction means for detecting, for each logic circuit, a backward resource management cell transferred through the physical circuit from the destination terminal to the predetermined cell switching unit, and extracting congestion indicator information indicating the congestion state from the backward resource management cell;

congestion indicator information storage means for storing, for each logic circuit, congestion indicator information currently set by said rate control information setting means in a forward resource management cell transferred through the physical circuit from the source terminal to the predetermined cell switching unit; and sixth comparison means for detecting, for each logic circuit, as the bottleneck path the logic circuit in the congestion state in the cell switching unit at the source terminal side based on the congestion indicator information extracted by said second backward resource management cell detection/parameter extraction means and current congestion indicator information stored in said congestion indicator information storage means.

9. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:

cell branch means for detecting and terminating, for each logic circuit established on a physical circuit, a backward resource management cell transferred through the physical circuit from the destination terminal to the predetermined cell switching unit;

backward resource management cell content storage means for storing, for each logic circuit, contents of the backward resource management cell;

comparison operation means for updating, for each logic circuit, contents of the backward resource management cell stored in said backward resource management cell content storage means by comparing contents of the backward resource management cell currently terminated by said cell branch means with contents of the backward resource management cell previously stored in said backward resource management cell content storage means;

cell generation/insertion means for generating, for each logic circuit, the backward resource management cell whose contents are stored in said backward resource management cell content storage means corresponding to the logic circuit, and inserting the cell into the physical circuit from the destination terminal to the predetermined cell switching unit; and transmission control means for instructing, for each logic circuit, said cell generation/insertion means to generate and insert the backward resource management cell by generating a predetermined timing signal.

10. The unit according to claim 9, wherein said transmission control means comprises:

first cell count means for counting, for each logic circuit, a number of the backward resource management cells arriving at said cell branch means; and seventh comparison means for comparing, for each logic circuit, a count value of the first cell count means with a predetermined value, and, if a matching result is detected, clearing the count value of the first cell count means and generating the predetermined timing signal.

11. The unit according to claim 9, wherein said transmission control means comprises first timer means for generating, for each logic circuit, the predetermined timing signal at a predetermined time corresponding to the logic circuit.

12. The unit according to claim 9, wherein said transmission control means comprises:

main information cell time interval count means for counting, for each logic circuit, a time interval of a main information cell transferred through the physical circuit from the source terminal to the predetermined cell switching unit; and second timer means for generating, for each logic circuit, the predetermined timing signal at a predetermined time corresponding to the time interval of the main information cell counted by said main information cell time interval count means.

13. The unit according to claim 9, wherein said transmission control means comprises:

backward resource management cell time interval count means for counting, for each logic circuit, an arrival time interval of the backward resource management cell at said cell branch means; and third timer means for generating, for each logic circuit, the predetermined timing signal at a predetermined time corresponding to the arrival time interval of the backward resource management cell counted by said backward resource management cell time interval count means.

14. The unit according to claim 9, wherein
said transmission control means comprises circuit comparison means for generating the predetermined timing signal when the backward resource management cell of a specific logic circuit arrives at said cell branch means.

15. The unit according to claim 9, wherein said transmission control means comprises:
second cell count means for counting, for each logic circuit, a number of the backward resource management cells arriving at said cell branch means;
fourth timer means for counting, for each logic circuit, a predetermined time interval; and
OR gate means for clearing, for each logic circuit, a count value of said cell count means and said fourth timer means and generating, for said each logic circuit, the predetermined timing signal whichever occurs earlier when a matching result is detected after comparing a count value of the second cell count means with a predetermined value or when said fourth timer means counts a predetermined time interval.

16. A cell rate control unit which is operated in a cell switching unit for self-switching a fixed-length cell according to routing information added to the cell, and varies a transmission rate of a cell in a source terminal by feeding back to the source terminal a congestion state in a cell switching unit using a resource management cell, said unit comprising:
cell branch means for detecting and terminating, for each logic circuit established on a physical circuit, a backward resource management cell transferred through the physical circuit from the destination terminal to the predetermined cell switching unit;
backward resource management cell content storage means for sequentially storing, for each logic circuit, contents of a plurality of the backward resource management cells sequentially terminated by said cell branch means;
comparison operation means for performing, for each logic circuit, a comparison operation by comparing contents of a plurality of the backward resource management cells previously stored in said backward resource management cell content storage means;
cell generation/insertion means for generating, for each logic circuit, a backward resource management cell having contents corresponding to a comparison operation result from said comparison operation means, and inserting the cell into the physical circuit from the destination terminal to the predetermined cell switching unit; and
transmission control means for generating, for each logic circuit, a predetermined timing signal to instruct said comparison operation means to perform the comparison operation and said cell generation/insertion means to generate and insert the backward resource management cell.

17. The unit according to claim 16, wherein said transmission control means comprises:
first cell count means for counting, for each logic circuit, a number of the backward resource management cells arriving at said cell branch means; and
seventh comparison means for comparing, for each logic circuit, a count value of the first cell count means with a predetermined value, and, if a matching result is detected, clearing the count value of the first cell count means and generating the predetermined timing signal.

18. The unit according to claim 16, wherein
said transmission control means comprises first timer means for generating, for each logic circuit, the predetermined timing signal at a predetermined time corresponding to the logic circuit.

19. The unit according to claim 16, wherein said transmission control means comprises:
main information cell time interval count means for counting, for each logic circuit, a time interval of a main information cell transferred through the physical circuit from the source terminal to the predetermined cell switching unit; and
second timer means for generating, for each logic circuit, the predetermined timing signal at a predetermined time corresponding to the; time interval of the main information cell counted by said main information cell time interval count means.

20. The unit according to claim 16, wherein said transmission control means comprises:
backward resource management cell time interval count means for counting, for each logic circuit, an arrival time interval of the backward resource management cell at said cell branch means; and
third timer means for generating, for each logic circuit, the predetermined timing signal at a predetermined time corresponding to the arrival time interval of the backward resource management cell counted by said backward resource management cell time interval count means.

21. The unit according to claim 16, wherein
said transmission control means comprises circuit comparison means for generating the predetermined timing signal when the backward resource management cell of a specific logic circuit arrives at said cell branch means.

22. The unit according to claim 16, wherein said transmission control means comprises:
second cell count means for counting, for each logic circuit, a number of the backward resource management cells arriving at said cell branch means;
fourth timer means for counting, for each logic circuit, a predetermined time interval; and
OR gate means for clearing, for each logic circuit, a count value of said cell count means and said fourth timer means and generating, for said each logic circuit, the predetermined timing signal, whichever occurs earlier, when a matching result is detected after comparing a count value of the second cell count means with a predetermined value or when said fourth timer means counts a predetermined time interval.

23. A cell rate control method which is followed for a cell switching unit for self-switching a fixed-length cell according to routing information added to the cell, and varies a transmission rate of a cell in a source terminal by feeding back to the source terminal a congestion state in the cell switching unit using a resource management cell, said method comprising the steps of:
predicting a bottleneck path, that is, a logic circuit having a transmission rate limited by a cell switching unit other than predetermined cell switching unit, the logic circuit being one of logic circuits using a predetermined physical circuit in said first cell switching unit, wherein said predicting a bottleneck includes comparing a current cell rate indicating a transmission rate of a current cell to an explicit cell rate indicating a transmission rate of a cell specified for a source terminal; and setting rate control information in a resource management cell transferred through the physical circuit based on a state of the logic circuit using the physical circuit, the congestion station in a switch in the predetermined cell switching unit, and information about the bottleneck path.

24. A cell rate control method which is followed in a cell switching unit for self-switching a fixed-length cell according to routing information added to the cell, and varies a transmission rate of a cell in a source terminal by feeding back to the source terminal a congestion state in a cell switching unit using a resource management cell, said method comprising the steps of:

detecting and terminating, for each logic circuit, a backward resource management cell transferred through a physical circuit from the destination terminal to the predetermined cell switching unit;

storing, for each logic circuit, contents of the backward resource management cell;

updating, for each logic circuit, contents of the stored backward resource management cell by comparing contents of the currently terminated backward resource management cell with contents of the previously stored backward resource management cell;

generating, for each logic circuit, the backward resource management cell whose contents are one of the stored backward resource management cell corresponding to the logic circuit, and inserting the cell into the physical circuit from the destination terminal to the predetermined cell switching unit; and controlling, for each logic circuit, generation and insertion of the backward resource management cell by generating a predetermined timing signal.

25. A cell rate control method which is operated in a cell switching unit for self-switching a fixed-length cell according to routing information added to the cell, and varies a transmission rate of a cell in a source terminal by feeding back to the source terminal a congestion state in a cell switching unit using a resource management cell, said method comprising the steps of:

detecting and terminating, for each logic circuit established on a physical circuit, a backward resource management cell transferred through the physical circuit from the destination terminal to the predetermined cell switching unit;

sequentially storing, for each logic circuit, contents of a plurality of the sequentially terminated backward resource management cells;

performing, for each logic circuit, a comparison operation by comparing contents of a plurality of the sequentially stored backward resource management cells;

generating, for each logic circuit, a backward resource management cell having contents corresponding to the comparison operation result, and inserting, for each logic circuit, the cell into the physical circuit from the destination terminal to the predetermined cell switching unit; and generating, for each logic circuit, a predetermined timing signal to control the comparison operation and generation and insertion of the backward resource management cell.

* * * * *